(12) United States Patent
Kachmar

(10) Patent No.: US 8,548,293 B2
(45) Date of Patent: Oct. 1, 2013

(54) FIBER OPTIC CABLE

(75) Inventor: Wayne M. Kachmar, North Bennington, VT (US)

(73) Assignee: ADC Telecommunications, Inc., Eden Prairie, MN (US)

( * ) Notice: Subject to any disclaimer, the term of this patent is extended or adjusted under 35 U.S.C. 154(b) by 291 days.

(21) Appl. No.: 12/473,931

(22) Filed: May 28, 2009

(65) Prior Publication Data

US 2009/0297104 A1    Dec. 3, 2009

Related U.S. Application Data

(60) Provisional application No. 61/056,465, filed on May 28, 2008, provisional application No. 61/109,048, filed on Oct. 28, 2008.

(51) Int. Cl.
*G02B 6/44* (2006.01)
(52) U.S. Cl.
USPC ............................. 385/101; 385/100; 385/113
(58) Field of Classification Search
USPC ................... 385/100, 101, 86, 87; 264/1.28, 264/1.29
See application file for complete search history.

(56) References Cited

U.S. PATENT DOCUMENTS

| | | |
|---|---|---|
| 3,873,389 A | 3/1975 | Daniels |
| 3,903,354 A | 9/1975 | Dageförde |
| 3,991,014 A | 11/1976 | Kleinschuster |
| 4,067,852 A | 1/1978 | Calundann |
| 4,083,829 A | 4/1978 | Calundann et al. |
| 4,089,585 A | 5/1978 | Slaughter et al. |
| 4,130,545 A | 12/1978 | Calundann |
| 4,161,470 A | 7/1979 | Calundann |
| 4,199,225 A | 4/1980 | Slaughter et al. |
| 4,304,462 A | 12/1981 | Baba et al. |
| 4,318,842 A | 3/1982 | East et al. |
| 4,359,598 A | 11/1982 | Dey et al. |
| 4,458,388 A | 7/1984 | Farago et al. |

(Continued)

FOREIGN PATENT DOCUMENTS

| | | |
|---|---|---|
| CN | 2667513 Y | 12/2004 |
| CN | 2722273 Y | 8/2005 |

(Continued)

OTHER PUBLICATIONS

Description of Fiber Optic Cable—LCF Microcable: Plenum, 6 pages (Aug. 2005).

(Continued)

*Primary Examiner* — Ellen Kim
(74) *Attorney, Agent, or Firm* — Merchant & Gould P.C.

(57) ABSTRACT

A fiber optic cable includes an optical fiber, a strength layer surrounding the optical fiber, and an outer jacket surrounding the strength layer. The strength layer includes a matrix material in which is integrated a plurality of reinforcing fibers. A fiber optic cable includes an optical fiber, a strength layer, a first electrical conductor affixed to an outer surface of the strength layer, a second electrical conductor affixed to the outer surface of the strength layer, and an outer jacket. The strength layer includes a polymeric material in which is embedded a plurality of reinforcing fibers. A method of manufacturing a fiber optic cable includes mixing a base material in an extruder. A strength layer is formed about an optical fiber. The strength layer includes a polymeric film with embedded reinforcing fibers disposed in the film. The base material is extruded through an extrusion die to form an outer jacket.

21 Claims, 15 Drawing Sheets

(56) References Cited

U.S. PATENT DOCUMENTS

| | | | |
|---|---|---|---|
| 4,468,364 A | 8/1984 | Ide | |
| 4,515,435 A | 5/1985 | Anderson | |
| 4,557,560 A * | 12/1985 | Bohannon et al. | 385/107 |
| 4,569,420 A | 2/1986 | Pickett et al. | |
| 4,595,793 A | 6/1986 | Arroyo et al. | |
| 4,626,306 A | 12/1986 | Chabrier et al. | |
| 4,644,098 A | 2/1987 | Norris et al. | |
| 4,659,174 A | 4/1987 | Ditscheid et al. | |
| 4,661,406 A | 4/1987 | Gruhn et al. | |
| 4,710,594 A | 12/1987 | Walling et al. | |
| 4,729,628 A | 3/1988 | Kraft et al. | |
| 4,730,894 A * | 3/1988 | Arroyo | 385/113 |
| 4,761,053 A | 8/1988 | Cogelia et al. | |
| 4,807,962 A | 2/1989 | Arroyo et al. | |
| 4,810,834 A | 3/1989 | Grögl et al. | |
| 4,818,060 A | 4/1989 | Arroyo | |
| 4,844,575 A | 7/1989 | Kinard et al. | |
| 4,852,965 A | 8/1989 | Mullin et al. | |
| 4,852,966 A | 8/1989 | Kimmich et al. | |
| 4,895,427 A | 1/1990 | Kraft | |
| 4,909,592 A | 3/1990 | Arroyo et al. | |
| 5,015,063 A | 5/1991 | Panuska et al. | |
| 5,125,063 A | 6/1992 | Panuska et al. | |
| 5,131,064 A | 7/1992 | Arroyo et al. | |
| 5,157,752 A | 10/1992 | Greveling et al. | |
| 5,214,730 A | 5/1993 | Nagasawa et al. | |
| 5,229,851 A | 7/1993 | Rahman | |
| 5,253,318 A | 10/1993 | Sayegh et al. | |
| 5,345,525 A | 9/1994 | Holman et al. | |
| 5,345,526 A | 9/1994 | Blew | |
| 5,503,928 A | 4/1996 | Cheshire | |
| 5,557,698 A | 9/1996 | Gareis et al. | |
| 5,573,857 A | 11/1996 | Auger | |
| 5,593,524 A | 1/1997 | Philips | |
| 5,627,932 A | 5/1997 | Kiel et al. | |
| 5,642,452 A | 6/1997 | Gravely et al. | |
| 5,656,796 A | 8/1997 | Marinos et al. | |
| 5,737,470 A | 4/1998 | Nagano et al. | |
| 5,838,864 A | 11/1998 | Patel et al. | |
| 5,925,461 A | 7/1999 | Fairgrieve | |
| 5,970,196 A | 10/1999 | Greveling et al. | |
| 5,978,536 A | 11/1999 | Brandi et al. | |
| 5,982,966 A | 11/1999 | Bonicel | |
| 6,014,487 A | 1/2000 | Field et al. | |
| 6,088,499 A | 7/2000 | Newton et al. | |
| 6,137,936 A | 10/2000 | Fitz et al. | |
| 6,249,628 B1 | 6/2001 | Rutterman et al. | |
| 6,256,438 B1 | 7/2001 | Gimblet | |
| 6,270,851 B1 | 8/2001 | Lee et al. | |
| 6,284,367 B1 | 9/2001 | Gruhn et al. | |
| 6,321,012 B1 | 11/2001 | Shen | |
| 6,347,172 B1 | 2/2002 | Keller et al. | |
| 6,348,236 B1 | 2/2002 | Fairgrieve et al. | |
| 6,356,690 B1 | 3/2002 | McAlpine et al. | |
| 6,370,303 B1 | 4/2002 | Fitz et al. | |
| 6,493,491 B1 | 12/2002 | Shen et al. | |
| 6,496,627 B1 | 12/2002 | Tuminaro | |
| 6,542,674 B1 | 4/2003 | Gimblet | |
| 6,621,964 B2 | 9/2003 | Quinn et al. | |
| 6,654,527 B2 * | 11/2003 | Sakabe et al. | 385/114 |
| 6,701,047 B1 | 3/2004 | Rutterman et al. | |
| 6,744,954 B1 | 6/2004 | Tanaka et al. | |
| 6,807,347 B2 | 10/2004 | McAlpine et al. | |
| 6,813,422 B1 | 11/2004 | Krishnamurthy et al. | |
| 6,836,603 B1 | 12/2004 | Bocanegra et al. | |
| 6,894,218 B2 | 5/2005 | Kohn et al. | |
| 6,897,382 B2 | 5/2005 | Hager et al. | |
| 6,899,776 B2 | 5/2005 | Bahlmann et al. | |
| 6,901,191 B2 | 5/2005 | Hurley et al. | |
| 6,937,801 B2 | 8/2005 | McAlpine et al. | |
| 7,006,740 B1 * | 2/2006 | Parris | 385/109 |
| 7,113,680 B2 | 9/2006 | Hurley et al. | |
| 7,218,821 B2 | 5/2007 | Bocanegra et al. | |
| 7,227,084 B2 | 6/2007 | Bates et al. | |
| 7,244,337 B2 | 7/2007 | Bahlmann et al. | |
| 7,349,642 B2 | 3/2008 | Tatematsu et al. | |
| 7,458,103 B2 | 12/2008 | Citterio et al. | |
| 8,031,996 B2 | 10/2011 | Willemsen et al. | |
| 2002/0025127 A1 * | 2/2002 | Graham et al. | 385/102 |
| 2006/0137156 A1 | 6/2006 | Kawabe et al. | |
| 2006/0159407 A1 | 7/2006 | Kachmar | |
| 2006/0280413 A1 | 12/2006 | Paschal et al. | |
| 2006/0291787 A1 | 12/2006 | Seddon | |
| 2007/0127878 A1 | 6/2007 | de Montmorillon et al. | |
| 2007/0280615 A1 | 12/2007 | de Montmorillon et al. | |
| 2008/0187276 A1 | 8/2008 | Roberts et al. | |
| 2009/0317039 A1 | 12/2009 | Blazer et al. | |
| 2010/0266247 A1 | 10/2010 | Willemsen et al. | |
| 2010/0322573 A1 | 12/2010 | Yasutomi et al. | |

FOREIGN PATENT DOCUMENTS

| | | |
|---|---|---|
| EP | 316922 | 11/1988 |
| EP | 569928 | 5/1993 |
| EP | 0837162 | 4/1998 |
| GB | 1433128 | 8/1972 |
| GB | 1 483 845 | 8/1977 |
| GB | 2 096 343 A | 10/1982 |
| GB | 2 296 575 A | 7/1996 |
| JP | 57-186708 | 11/1982 |
| JP | 10-130996 | 5/1998 |
| JP | 2001-166188 | 6/2001 |
| JP | 2001-208942 | 8/2001 |
| JP | 2001-337255 | 12/2001 |
| JP | 2006-313314 | 11/2006 |
| WO | WO 03/091006 | 11/2003 |
| WO | WO2004/090628 | 10/2004 |
| WO | WO 2009-068541 | 6/2009 |

OTHER PUBLICATIONS

Fiber Optic Cable LCF Microcable: Plenum, *ADC Telecommunications, Inc.*, 4 pages (Aug. 2005).
International Search Report and Written Opinion mailed Jan. 25, 2010.
ADC Spec Sheet, Fiber Optic Cable, Ruggedized Simplex and Duplex Cables, ADC®, Oct. 2005, 4 pages.
ADC Spec Sheet, Fiber Optic Cable, Tactical Cables, ADC®, Oct. 2005, 4 pages.
Superior Essex, FTTP Tight Buffered Indoor/Outdoor Drop, Series W7, RoHS, Product Bulletin, OSP Fiber Produtcs, Nov. 2008, 2 pages.
Teijin, Making the Zetta World Possible, Oct. 2009, 2 pages.
Declaration of Wayne Kachmar including Exhibits A-C, 32 pages.

* cited by examiner

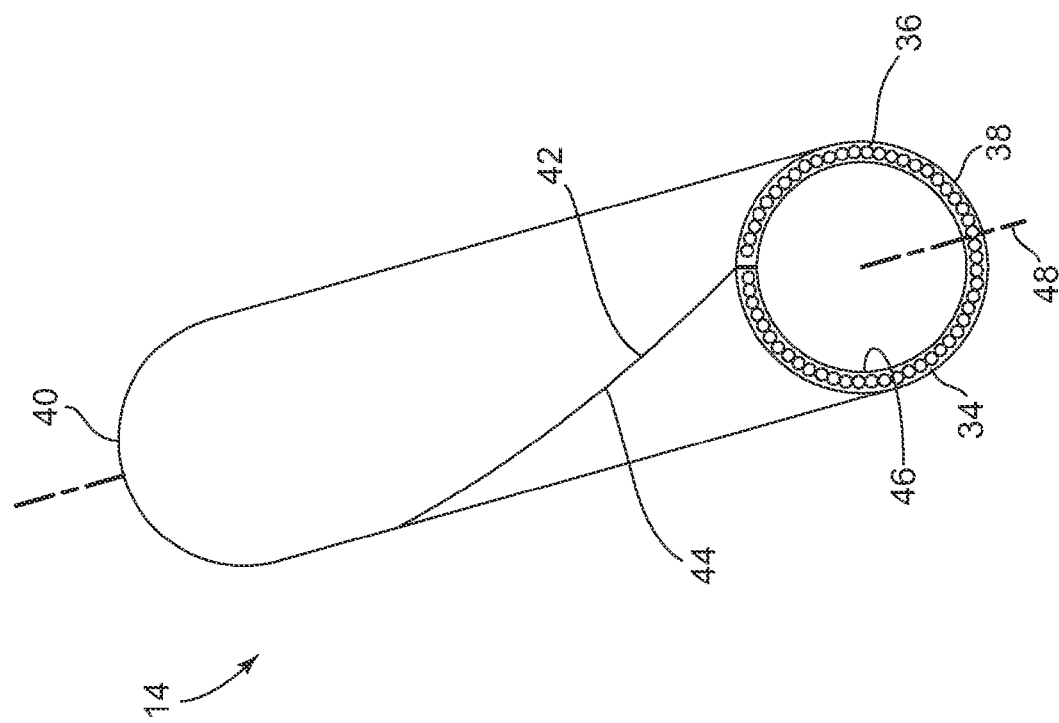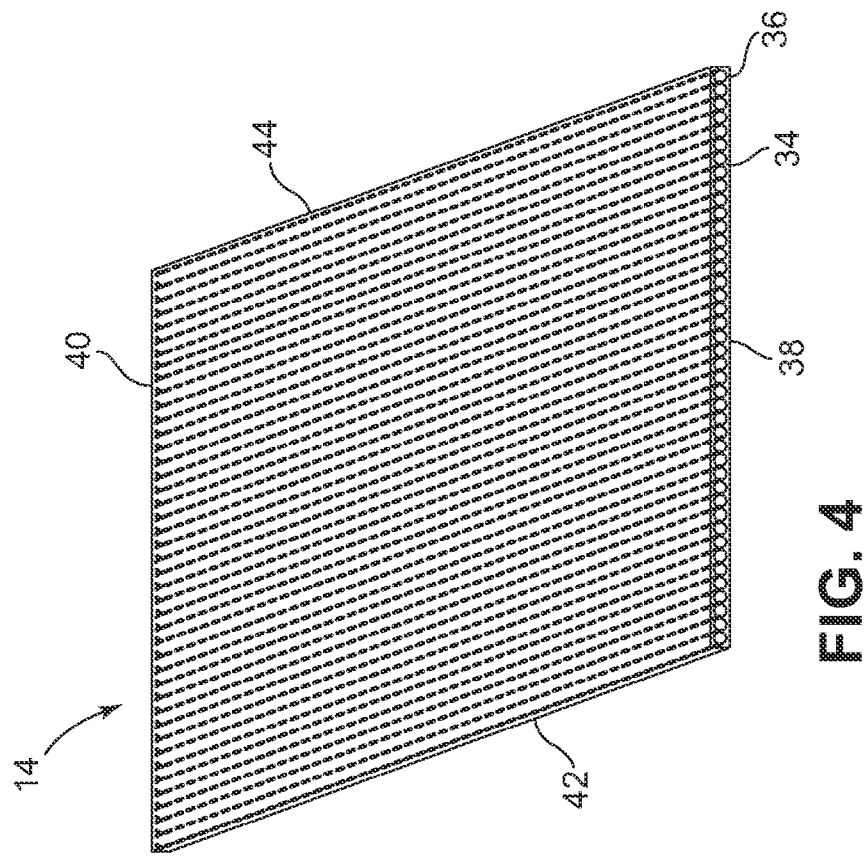

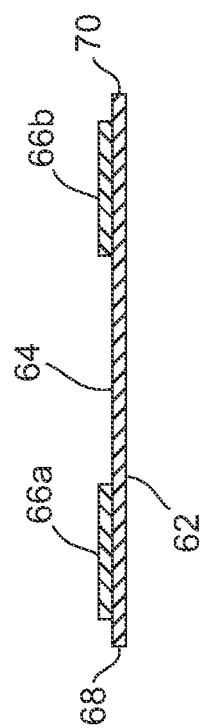
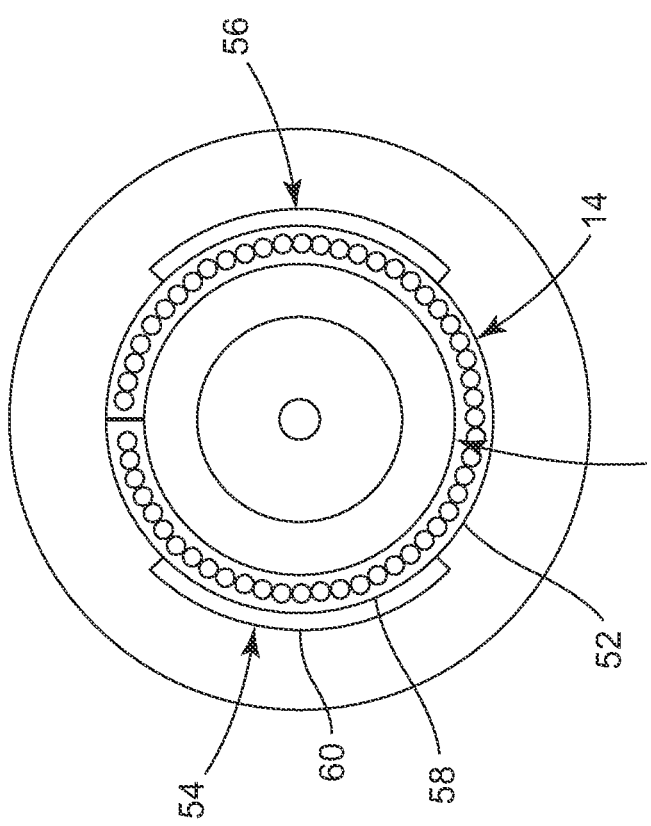
FIG. 9
FIG. 8

FIBER OPTIC CABLE

CROSS-REFERENCE TO RELATED APPLICATIONS

The present application claims priority to U.S. Provisional Patent Application Ser. No. 61/056,465 entitled "Fiber Optic Cable" and filed on May 28, 2008 and U.S. Provisional Patent Application Ser. No. 61/109,048 entitled "Fiber Optic Cable" and filed on Oct. 28, 2008, the disclosures of which are hereby incorporated by reference in their entirety.

BACKGROUND

A fiber optic cable typically includes: (1) an optical fiber; (2) a buffer layer that surrounds the optical fiber; (3) a plurality of strength members loosely surrounding the buffer layer; and (4) an outer jacket. Optical fibers function to carry optical signals. A typical optical fiber includes an inner core surrounded by a cladding that is protected by a coating. The buffer layer functions to surround and protect the coated optical fibers. Strength members add mechanical strength to fiber optic cables to protect the internal optical fibers against stresses applied to the cables during installation and thereafter. Outer jackets also provide protection against chemical damages.

The use of strength members that loosely surround the optical fiber can create difficulties in manufacturing and/or installing fiber optic cables as these loosely situated strength members can be difficult to cut and difficult to use in automated manufacturing processes.

SUMMARY

An aspect of the present disclosure relates to a fiber optic cable having an optical fiber, a strength layer surrounding the optical fiber, and an outer jacket surrounding the strength layer. The strength layer includes a matrix material in which is integrated a plurality of reinforcing fibers.

Another aspect of the present disclosure relates to a fiber optic cable having an optical fiber, a strength layer surrounding the optical fiber, a first electrical conductor affixed to an outer surface of the strength layer, a second electrical conductor affixed to the outer surface of the strength layer, and an outer jacket surrounding the strength layer. The strength layer includes a polymeric material in which is integrated a plurality of reinforcing fibers.

Another aspect of the present disclosure relates to a method of manufacturing a fiber optic cable. The method includes mixing a base material in an extruder. A strength layer is formed about an optical fiber. The strength layer includes a polymeric film with integrated reinforcing fibers disposed in the film. The base material is extruded through an extrusion die to form an outer jacket.

A variety of additional aspects will be set forth in the description that follows. These aspects can relate to individual features and to combinations of features. It is to be understood that both the foregoing general description and the following detailed description are exemplary and explanatory only and are not restrictive of the broad concepts upon which the embodiments disclosed herein are based.

DRAWINGS

FIG. 4 is perspective view of a pre-formed strength layer of the fiber optic cable of FIG. 1.

FIG. 5 is a perspective view of the strength layer of FIG. 4 in a generally cylindrical shape.

FIG. 8 is a cross-sectional view of the fiber optic cable of FIG. 7.

FIG. 9 is a cross-sectional view of an embodiment of first and second electrical conductors suitable for use with the fiber optic cable of FIG. 7.

DETAILED DESCRIPTION

Reference will now be made in detail to the exemplary aspects of the present disclosure that are illustrated in the accompanying drawings. Wherever possible, the same reference numbers will be used throughout the drawings to refer to the same or like structure.

Figure 1:
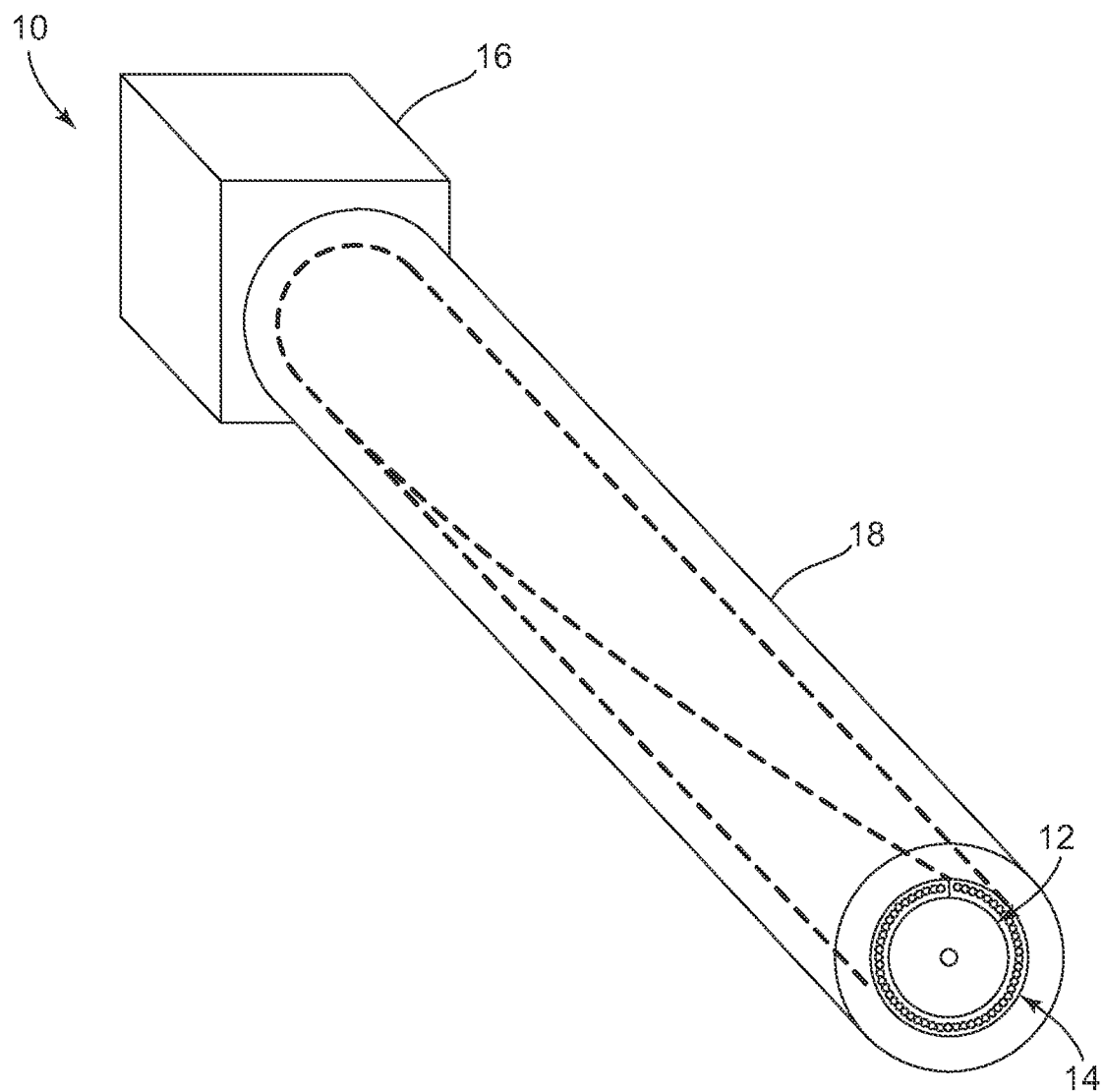
FIG. 1 is a fragmentary perspective view of a fiber optic cable having features that are examples of aspects in accordance with the principles of the present disclosure.

Referring now to FIG. 1, a fiber optic cable, generally designated 10, is shown. The fiber optic cable 10 includes at least one optical fiber 12, a strength layer 14 surrounding the optical fiber 12, and an outer jacket 18 surrounding the strength layer 14. In the subject embodiment, the fiber optic cable 10 includes a connector 16 disposed at an end of the fiber optic cable 10.

Figure 2:
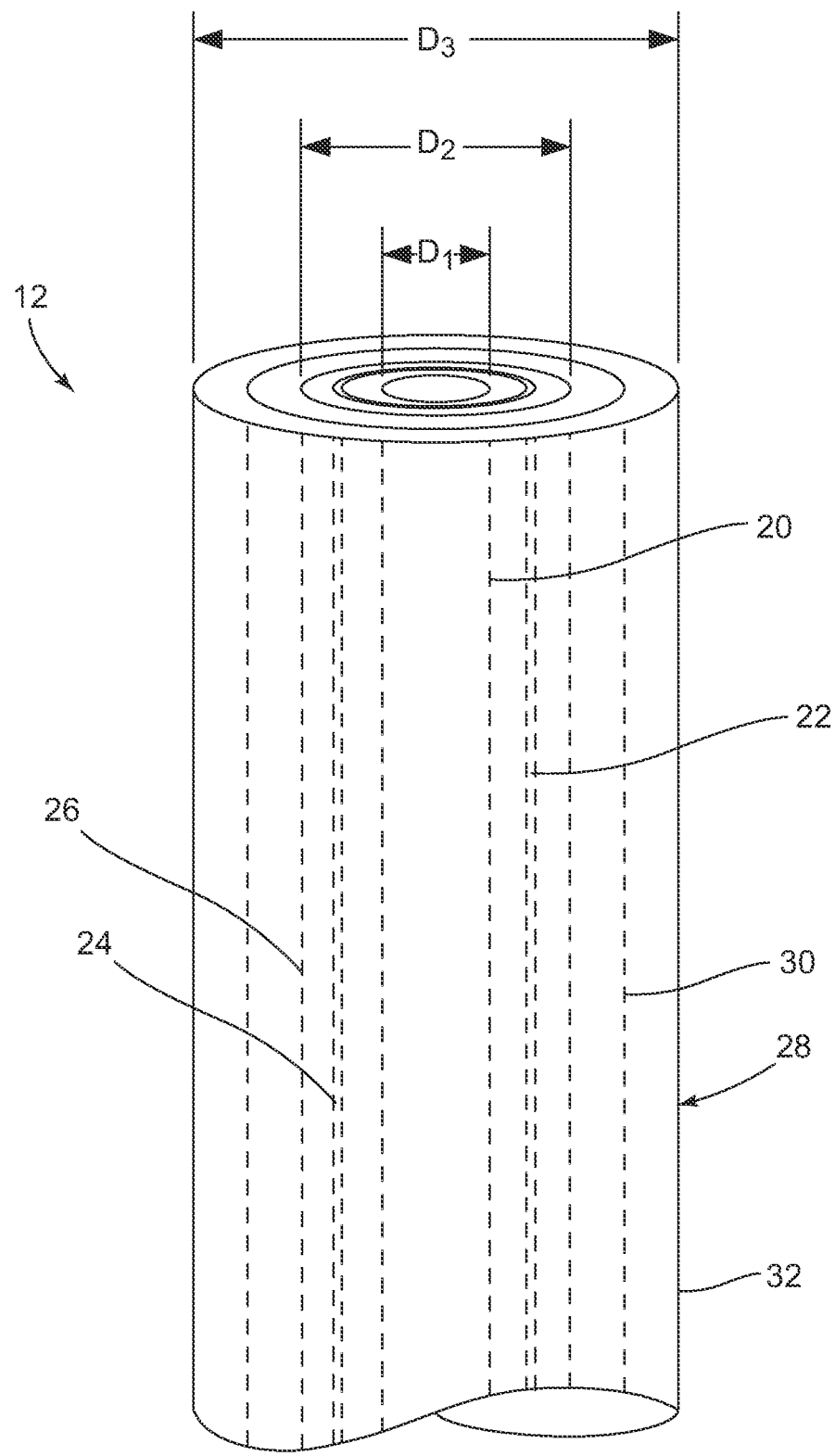
FIG. 2 is a perspective view of an optical fiber suitable for use in the fiber optic cable of FIG. 1.

Referring now to FIG. 2, the optical fiber 12 includes a core 20. The core 20 is made of a glass material, such as a silica-based material, having an index of refraction. In the subject embodiment, the core 20 has an outer diameter $D_1$ of less than or equal to about 10 μm.

The core 20 of each optical fiber 12 is surrounded by a first cladding layer 22 that is also made of a glass material, such as a silica based-material. The first cladding layer 22 has an index of refraction that is less than the index of refraction of the core 20. This difference between the index of refraction of the first cladding layer 22 and the index of refraction of the core 20 allows an optical signal that is transmitted through the optical fiber 12 to be confined to the core 20.

A trench layer 24 surrounds the first cladding layer 22. The trench layer 24 has an index of refraction that is less than the index of refraction of the first cladding layer 22. In the subject embodiment, the trench layer 24 is immediately adjacent to the first cladding layer 22.

A second cladding layer 26 surrounds the trench layer 24. The second cladding layer has an index of refraction. In the subject embodiment, the index of refraction of the second cladding layer 26 is about equal to the index of refraction of the first cladding layer 22. The second cladding layer 26 is immediately adjacent to the trench layer 24. In the subject embodiment, the second cladding layer 26 has an outer diameter $D_2$ of less than or equal to 125 μm.

A coating, generally designated 28, surrounds the second cladding layer 26. The coating 28 includes an inner layer 30 and an outer layer 32. In the subject embodiment, the inner layer 30 of the coating 28 is immediately adjacent to the second cladding layer 26 such that the inner layer 30 surrounds the second cladding layer 26. The inner layer 30 is a polymeric material (e.g., polyvinyl chloride, polyethylenes, polyurethanes, polypropylenes, polyvinylidene fluorides, ethylene vinyl acetate, nylon, polyester, or other materials) having a low modulus of elasticity. The low modulus of elasticity of the inner layer 30 functions to protect the optical fiber 12 from microbending.

The outer layer 32 of the coating 28 is a polymeric material having a higher modulus of elasticity than the inner layer 30. In the subject embodiment, the outer layer 32 of the coating 28 is immediately adjacent to the inner layer 30 such that the outer layer 32 surrounds the inner layer 30. The higher modulus of elasticity of the outer layer 32 functions to mechanically protect and retain the shape of optical fiber 12 during handling. In the subject embodiment, the outer layer 32 defines an outer diameter $D_3$ of less than or equal to 500 μm. In another embodiment, the outer layer 32 has an outer diameter $D_3$ of less than or equal to 250 μm.

In the subject embodiment, the optical fiber 12 is manufactured to reduce the sensitivity of the optical fiber 12 to micro or macro-bending (hereinafter referred to as "bend insensitive"). An exemplary bend insensitive optical fiber 12 has been described in U.S. Pat. Application Publication Nos. 2007/0127878 and 2007/0280615 and are hereby incorporated by reference in their entirety. An exemplary bend insensitive optical fiber 12 suitable for use in the fiber optic cable 10 of the present disclosure is commercially available from Draka Comteq under the name BendBright XS.

Figure 3:
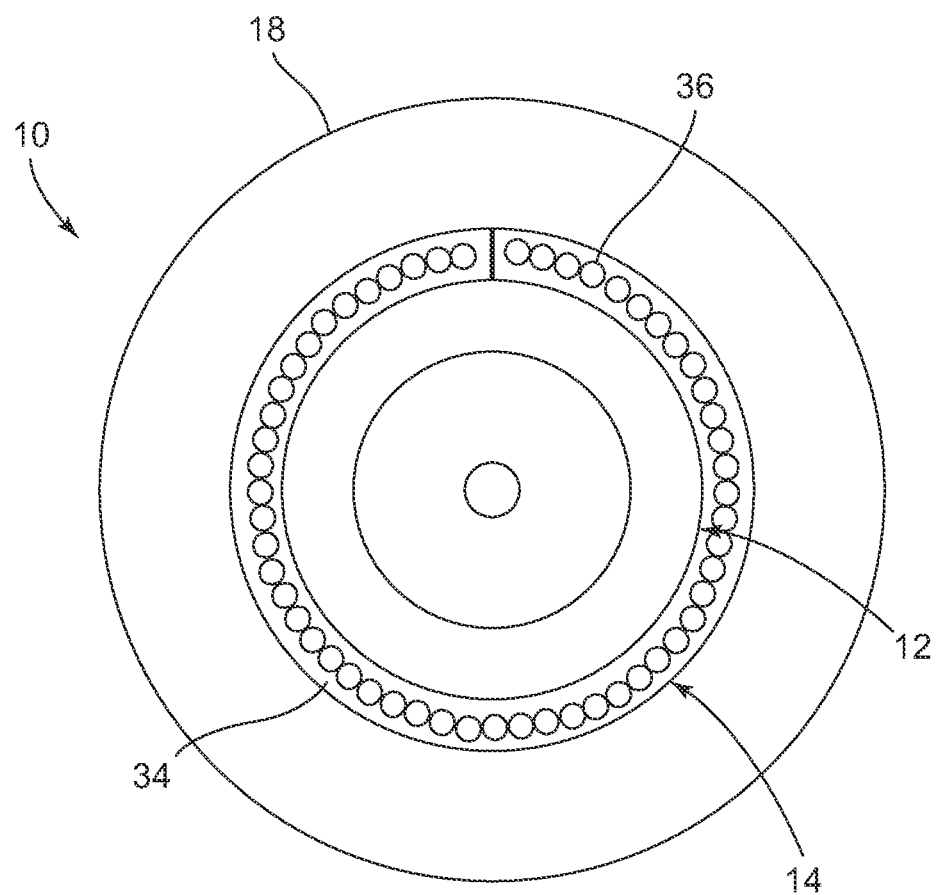
FIG. 3 is a cross-sectional view of the fiber optic cable of FIG. 1.

Referring now to FIGS. 3-5, the strength layer 14 is a flat and flexible sheet, film, or layer of material that is adapted to surround the optical fibers 12. The strength layer 14 is flat in that the width and the height of the strength layer 14 are generally consistent throughout the length of the strength layer 14 and in that the width of the strength layer 14 is greater than the height of the strength layer 14 throughout the length of the strength layer 14. For example, in one embodiment, the strength layer 14 has a width of 0.12 inches and a height of 0.030 inches. In other examples, the width of the strength layer 14 may be five, ten, or fifteen times as greater than the height of the strength layer 14. Other proportions of the width of the strength layer 14 to the height of strength layer 14 may be possible.

The strength layer 14 includes a binder 34 and a plurality of reinforcing fibers 36 embedded or otherwise integrated within the binder 34. In one example embodiment, the binder 34 is a polymeric material such as ethylene acetate, acrylite (e.g., UV-cured, etc.), silicon (e.g., RTV, etc.), polyester films (e.g., biaxially oriented polyethylene terephthalate polyester film, etc.), and polyisobutylene. In other example instances, binder 34 may be a matrix material, an adhesive material, a finish material, or another type of material that binds, couples, or otherwise mechanically links together reinforcing fibers 36.

The reinforcing fibers 36 are strands that extend the length of the strength layer 14. It will be understood, however, that the scope of the present disclosure is not limited to the reinforcing fibers 36 extending the length of the strength layer 14. In one embodiment, the reinforcing fibers 36 are aramid fibers. In another embodiment, the reinforcing fibers 36 are glass fibers, such as E-glass, S-glass, or another type of glass fiber. The width and height of the strength layer 14 may vary depending on the type of material from which the reinforcing fibers 36 are made. For example, when the strength layer 14 is made of E-glass or S-glass, the strength layer 14 may have a width of 0.085 inches and a height of 0.045 inches. In another example in which the strength layer is made of aramid fibers, the strength layer 14 may have a width of 0.12 inches and a height of 0.030 inches. It will be understood that the strength layer 14 may other widths and heights.

The reinforcing fibers 36 are disposed in a single layer within the binder 34. It will be understood, however, that the scope of the present disclosure is not limited to the reinforcing fibers 36 being disposed in a single layer as the reinforcing fibers 36 could be disposed in multiple layers. For example, the reinforcing fibers 36 may be disposed in groups. In this example, the reinforcing fibers 36 may be disposed in groups comprising a variety of different numbers of reinforcing fibers. For instance, each of the groups may comprise 500 reinforcing fibers, 1000 reinforcing fibers, 1500 reinforcing fibers, 2000 reinforcing fibers, or other numbers of reinforcing fibers. Furthermore, in some instances, not all of the groups have the same number of reinforcing fibers.

The binder 34 of the strength layer 14 provides a medium that retains the reinforcing fibers 36. The retention of the reinforcing fibers 36 in the binder 34 is advantageous as the binder 34 with the reinforcing fibers 36 is easier to cut with shears during manufacturing, installation, or repair of the fiber optic cable 10 than cable having reinforcing fibers that are loosely disposed in the cable. In addition, the manufacturing of fiber optic cable 10 having the binder 34 with the reinforcing fibers 36 is easier to automate than cable having loose reinforcing fibers.

The strength layer 14 includes a first axial end 38, an oppositely disposed second axial end 40, a first longitudinal edge 42, and a second longitudinal edge 44. The strength layer 14 is a flexible layer that is capable of being bent without breaking. As the sheet of polymeric material with the integrated reinforcing members is flexible, the strength layer 14 is formed into a generally cylindrical shape during the manufacturing of the fiber optic cable 10. In the depicted embodiment of FIG. 5, the strength layer 14 is formed in the generally cylindrical shape by abutting the first and second longitudinal edges 42, 44 of the strength layer 14 such that the strength layer 14 defines a longitudinal bore 46. In the subject embodiment, the optical fiber 12 is disposed within the longitudinal bore 46.

As best shown in FIG. 5, the second axial end 40 is rotationally displaced from the first axial end 38 about a longitudinal axis 48 of the strength layer 14. In the subject embodiment, the strength layer 14 is twisted about the longitudinal axis 48 such that the butt joint formed by the abutment of the first and second longitudinal edges 42, 44 is helically disposed along the length of the strength layer 14. This helical disposition of the butt joint may be advantageous as it eliminates or reduces the risk of a space or gap forming between the first longitudinal edge 42 and the second longitudinal edge 44.

Figure 6:
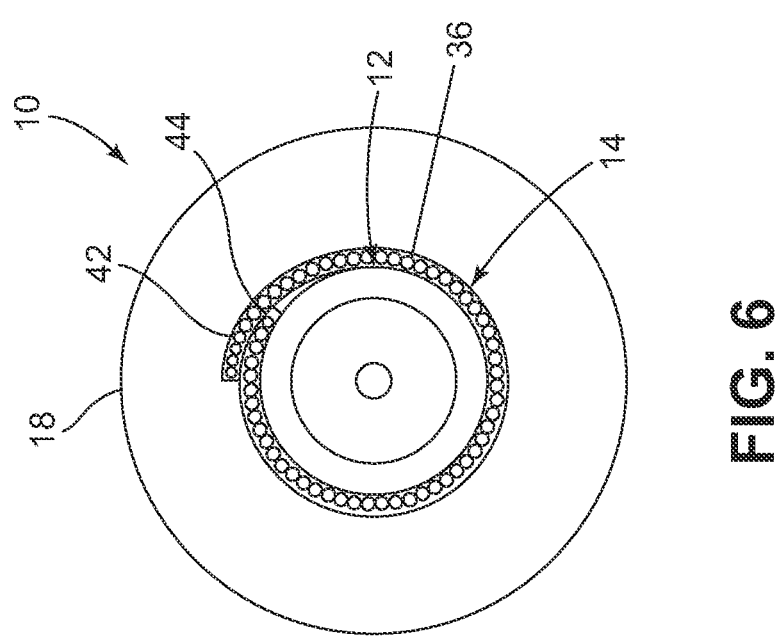
FIG. 6 is a cross-sectional view of an alternate embodiment of a strength layer suitable for use with the fiber optic cable of FIG. 1.

Referring now to FIG. 6, an alternate embodiment of the strength layer 14 is shown. In this alternate embodiment, the first longitudinal edge 42 overlaps the second longitudinal edge 44. As the overlap of the first and second longitudinal edges 42, 44 reduces the risk of a space forming between the first and second longitudinal edges 42, 44, the first and second axial ends 38, 40 are not rotationally offset in this alternate embodiment.

Referring now to FIGS. 1 and 3, the outer jacket 18 of the fiber optic cable 10 surrounds the strength layer 14. The outer jacket 18 includes a base material that is a thermoplastic material. In one embodiment, the base material is a low-smoke zero halogen material such as low-smoke zero halogen polyolefin and polycarbonate. In another embodiment, the base material is a conventional thermoplastic material such as polyethylene, polypropylene, ethylene-propylene, copolymers, polystyrene and styrene copolymers, polyvinyl chloride, polyamide (nylon), polyesters such as polyethylene terephthalate, polyetheretherketone, polyphenylene sulfide, polyetherimide, polybutylene terephthalate, as well as other thermoplastic materials.

In one embodiment, an inner diameter of the outer jacket 18 is bonded to the strength layer 14. This bonding of the inner diameter of the outer jacket 18 and the strength layer 14 can be chemical bonding or thermal bonding. For example, the strength layer 14 may be coated with ethylene acetate to bond the strength layer 14 to the outer jacket 18. In another embodiment, the inner diameter of the outer jacket 18 is not bonded to the strength layer 14.

In the subject embodiment, the outer jacket 18 has an outer diameter that is less than or equal to about 4 mm. In another embodiment, the outer jacket 18 has an outer diameter that is less than or equal to about 3.0 mm. In another embodiment, the outer jacket 18 has an outer diameter that is less or equal to about 2.0 mm. In another embodiment, the outer jacket 18 has an outer diameter that is less than or equal to about 1.6 mm. In another embodiment, the outer jacket 18 has an outer diameter that is less than or equal to about 1.2 mm.

In one embodiment, the outer jacket 18 includes shrinkage reduction material disposed in the base material. The shrinkage reduction material in the base material of the outer jacket 18 is adapted to resist post-extrusion shrinkage. U.S. patent application Ser. No. 11/039,122 (now U.S. Pat. No. 7,379,642) describes an exemplary use of shrinkage reduction material in the base material of the outer jacket and is hereby incorporated by reference in its entirety.

In one embodiment, the shrinkage reduction material is liquid crystal polymer (LCP). Examples of liquid crystal polymers suitable for use in the fiber optic cable 10 are described in U.S. Pat. Nos. 3,991,014; 4,067,852; 4,083,829; 4,130,545; 4,161,470; 4,318,842; and 4,468,364 and are hereby incorporated by reference in their entireties.

In order to promote flexibility in the fiber optic cable 10, the concentration of shrinkage reduction material is relatively small as compared to the base material. In one embodiment, and by way of example only, the shrinkage reduction material constitutes less than about 10% of the total weight of the outer jacket 18. In another embodiment, and by way of example only, the shrinkage reduction material constitutes less than only about 5% of the total weight of the outer jacket 18. In another embodiment, the shrinkage reduction material constitutes less than about 2% of the total weight of the outer jacket 18. In another embodiment, the shrinkage reduction material constitutes less than about 1.9%, less than about 1.8%, less than about 1.7%, less than about 1.6%, less than about 1.5%, less than about 1.4%, less than about 1.3%, less than about 1.2%, less than about 1.1%, or less than about 1% of the total weight of the outer jacket 18.

Figure 7:
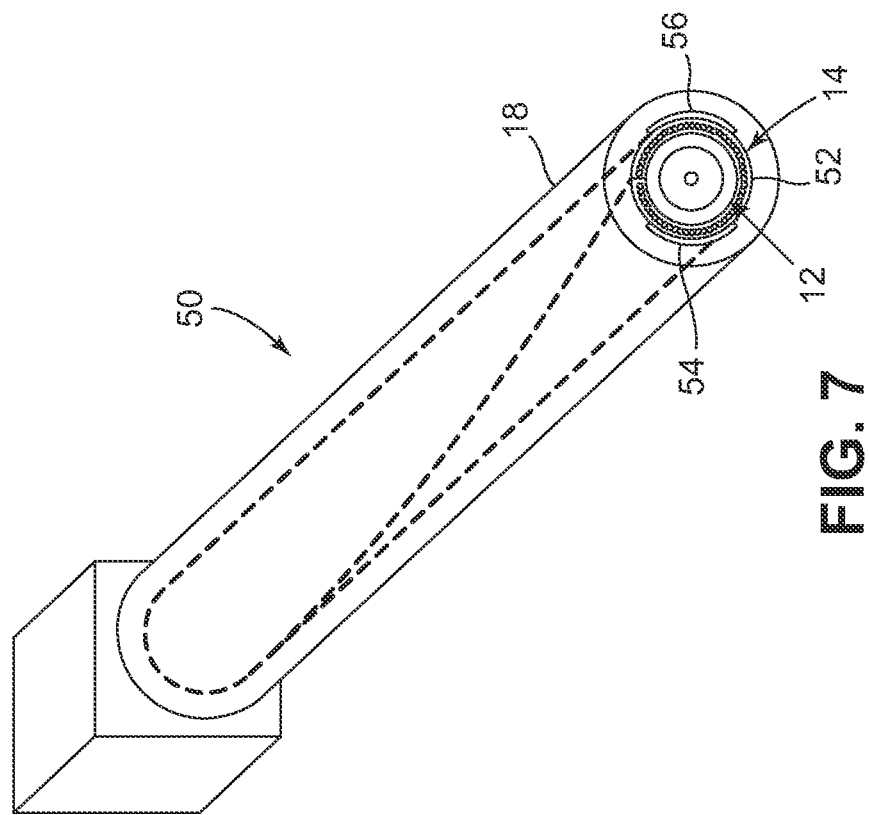
FIG. 7 is a perspective view of an alternate embodiment of a fiber optic cable having features that are example of aspects in accordance with the principles of the present disclosure.

Referring now to FIGS. 7 and 8, an alternate embodiment of a fiber optic cable assembly, generally designated 50, is shown. In this alternate embodiment, the fiber optic cable assembly 50 includes the optical fiber 12, the strength layer 14, and the outer jacket 18.

In the subject embodiment, the strength layer 14 includes an outer surface 52. First and second electrical conductors 54, 56 are oppositely mounted to the outer surface 52 of the strength layer 14 and extend the length of the strength layer 14 between the first and second axial ends 38, 40 (shown in FIGS. 4 and 5). The first and second electrical conductors 54, 56 are spaced apart (e.g., circumferentially spaced-apart) about the outer surface 52 of the strength layer 14 such that first electrical conductor 54 is not in electrical communication with the second electrical conductor 56. In the subject embodiment, the first and second electrical conductors 54, 56 are disposed about 180 degrees apart.

In one embodiment, the first and second electrical conductors 54, 56 are formed from conductive tape (e.g., metalized polyester tape, metalized MYLAR® tape, etc.). In one embodiment, the conductive tape has a width that is larger than the thickness of the conductive tape. In one embodiment, the conductive tape includes an adhesive surface 58 and an oppositely disposed conductive surface 60. The adhesive surface 58 is affixed to the outer surface 52 of the strength layer 14.

In the depicted embodiments of FIGS. 7-8, the first and second electrical conductors 54, 56 are made from separate strips of conductive tape. In the depicted embodiment of FIG. 9, the first and second electrical conductors are formed from conductive tape having a first surface 62 and an oppositely disposed second surface 64. The first surface 62 includes an adhesive for affixing the conductive tape to the outer surface 52 of the strength layer 14. The second surface 64 includes first and second conductive strips 66a, 66b. The first and second conductive strips 66a, 66b are separated such that the first conductive strip 66a is not in electrical communication with the second conductive strip 66b. In the depicted embodiment of FIG. 9, the first conductive strip 66a is disposed adjacent to a first side 68 of the metalized tape while the second conductive strip 66b is disposed adjacent to a second side 70. In the subject embodiment, the width of the conductive tape is sized so that the first and second conductive strips 66a, 66b are disposed about 180 degrees apart when the conductive tape is affixed to the strength layer 14.

Figure 10:
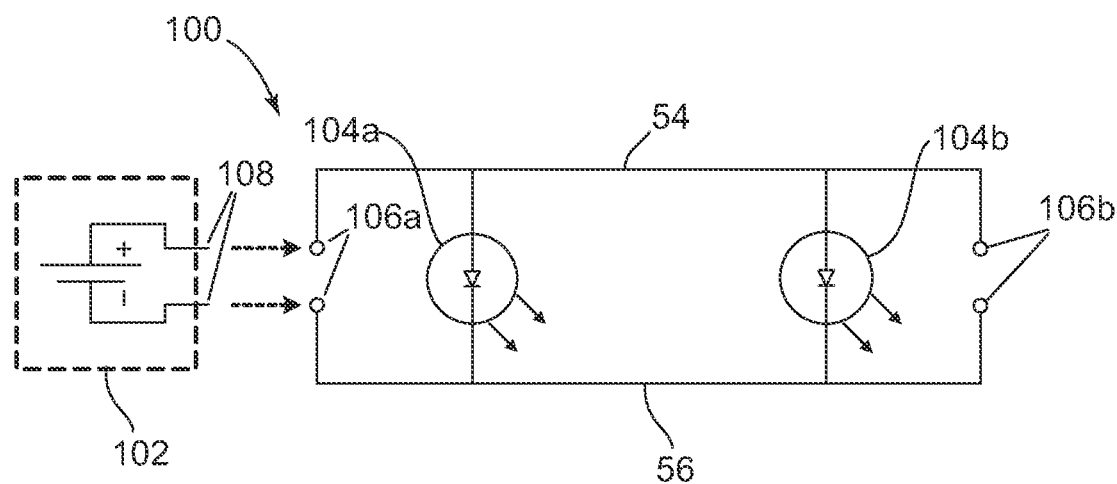
FIG. 10 is a schematic representation of a tracer light system circuit.
Figure 11:
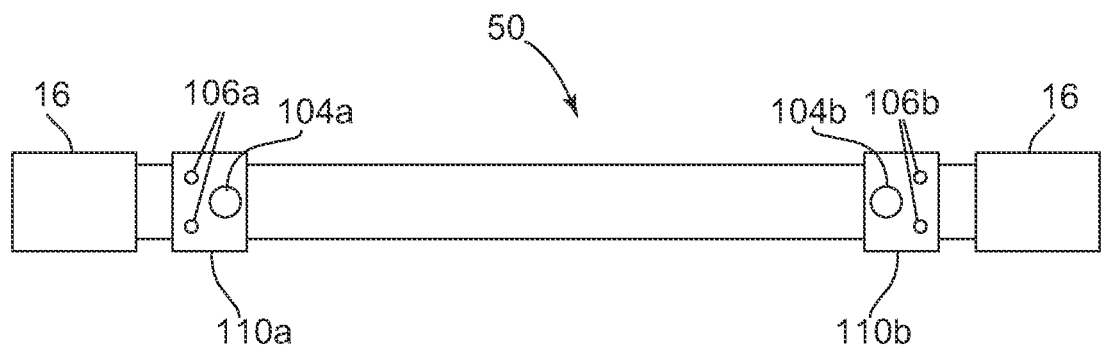
FIG. 11 is a schematic representation of a tracer light system installed on the fiber optic cable of FIG. 7.

Referring now to FIGS. 10 and 11, a schematic representation of a tracer light system, generally designated 100, is shown. The tracer light system 100 can be used to identify an end of an individual fiber optic cable 50 when multiple fiber optic cables 50 are being routed through a particular location. The tracer light system 100 includes a power source 102, first and second tracer lights 104a, 104b, respectively, and first and second contacts 106a, 106b, respectively.

In the subject embodiment, the power source 102 is a device including mating contacts 108 that are adapted for electrical communication with one of the first and second contacts 106a, 106b. In the subject embodiment, the power source 102 further includes a battery (e.g., alkaline, nickel-cadmium, nickel-metal hydride, etc.).

In the depicted embodiment of FIG. 11, the first and second tracer lights 104a, 104b and the first and second contacts 106a, 106b are disposed in first and second housings 110a, 110b, respectively. Each of the first and second housings 110a, 110b is engaged with the fiber optic cable 50. In the subject embodiment, the first housing 110a is disposed at one end of the fiber optic cable 50 while the second housing 110b is disposed at an opposite end of the fiber optic cable 50.

Each of the first and second tracer lights 104a, 104b includes an illumination source (e.g., a light-emitting diode (LED), etc.). In the subject embodiment, the first tracer light 104a is in electrical communication with the first and second electrical conductors 54, 56 of the fiber optic cable 50 and the first contacts 106a while the second tracer light 104b is in electrical communication with the first and second electrical conductors 54, 56 and the second contacts 106b.

In operation, the mating contacts 108 of the power source 102 are placed electrical communication with one of the first and second contacts 106a, 106b in one of the first and second housings 110a, 110b of the fiber optic cable 50. With power supplied to the first and second electrical conductors 54, 56 through one of the first and second contacts 106a, 106b, the first and second tracer lights 104a, 104b on the fiber optic cable 50 illuminate. With the first and second tracer lights 104a, 104b of the fiber optic cable 50 illuminated, the corresponding end of the fiber optic cable 50 can be quickly identified.

Figure 12:
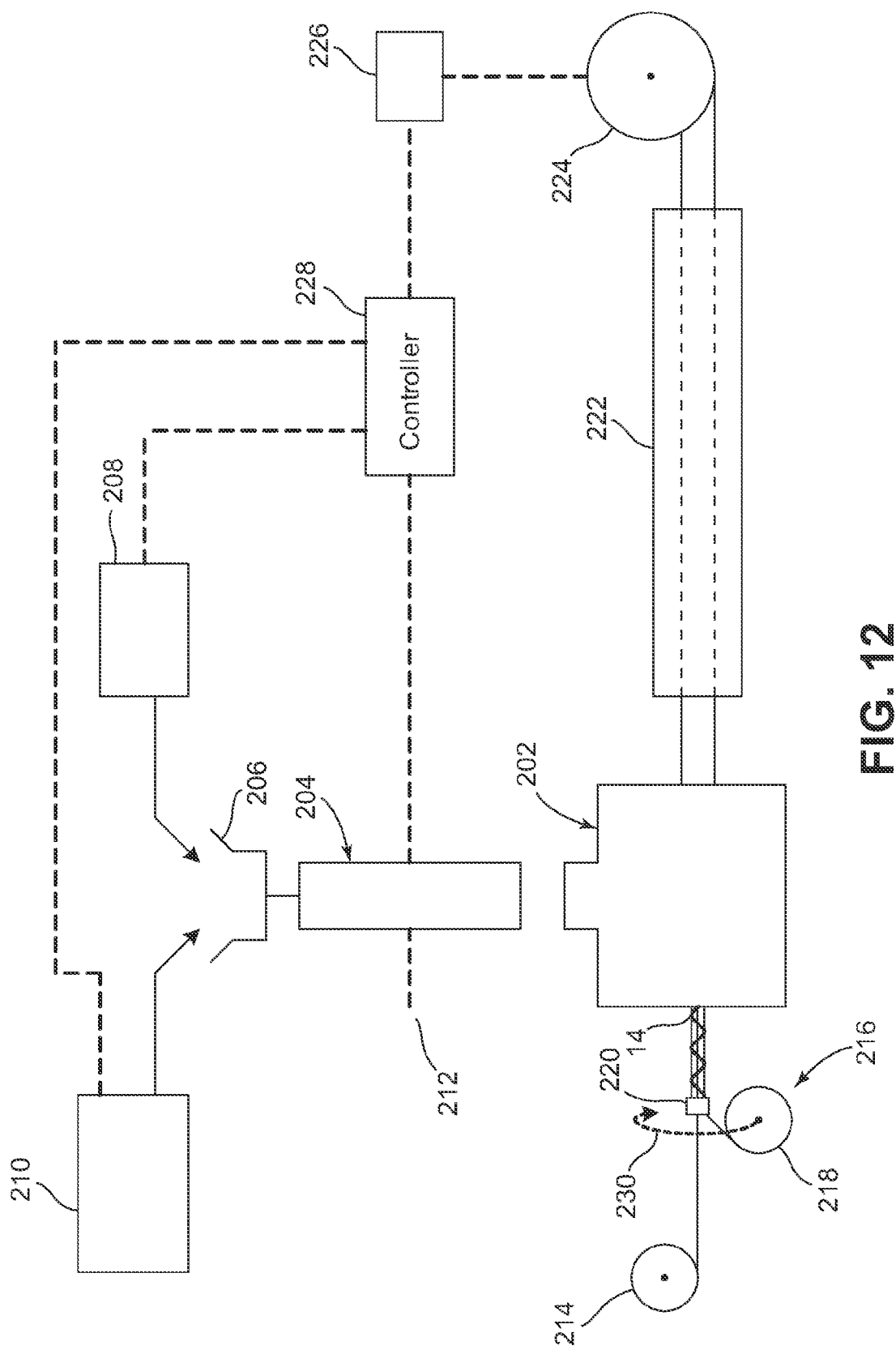
FIG. 12 is a schematic representation of a system for manufacturing the fiber optic cable of FIGS. 1 and 7 in accordance with the principles of the present disclosure.

Referring now to FIG. 12, a schematic representation of a system 200 for making the fiber optic cable 50 is shown. The system 200 includes a crosshead, generally designated 202, that receives thermoplastic material from an extruder 204. A hopper 206 is used to feed materials into the extruder 204. A first conveyor 208 conveys the base material to the hopper 206. In an embodiment in which the fiber optic cable 50 includes shrinkage reduction material integrated within the outer jacket 18, a second conveyor 210 is used to convey the shrinkage reduction material to the hopper 206. The extruder 204 is heated by a heating system 212 that may include one or more heating elements for heating zones of the extruder 204 as well as the crosshead 202 to desired processing temperatures. The optical fiber 12 is fed into the crosshead 202 from a feed roll 214.

An application assembly 216 is used to apply the strength layer 14 to the optical fiber 12. The application assembly 216 includes a first supply roll 218 and a longitudinal folding tool 220. The strength layer 14 is disposed on the first supply roll 218. In one embodiment, the strength layer 14, which is disposed on the first supply roll 218, includes the first and second electrical conductors 54, 56 affixed to the outer surface 52 of the strength layer 14.

The longitudinal folding tool 220 is used to form the generally cylindrical shape of the strength layer 14. In the subject embodiment, as the optical fiber 12 passes the first supply roll 218, the strength layer 14 disposed on the first supply roll 218 is paid out or dispensed. The strength layer 14 enters the longitudinal folding tool 220 where the strength layer 14 is formed into the cylindrical shape about the optical fiber 12 and applied around the optical fiber 12.

A water trough 222 is located downstream from the crosshead 202 for cooling the extruded product that exits the crosshead 202. The cooled final product is stored on a take-up roll 224 rotated by a drive mechanism 226. A controller 228 coordinates the operation of the various components of the system 200.

In one embodiment, the feed roll 214 and the take-up roll 224 remain stationary while the first supply roll 218 and the longitudinal folding tool 220 rotate in a direction 230 (shown as a dashed arrow in FIG. 12) about the optical fiber 12 so that the strength layer 14 is helically wrapped about the longitudinal axis 48. In this embodiment, the feed roll 214 and the take-up roll 224 are held stationary so that the optical fiber 12 does not get twisted. In another embodiment, the feed roll 214, the take-up roll 224 and the longitudinal folding tool 220 remain stationary while the first supply roll 218 rotates in the direction 230.

In an alternate embodiment, the first supply roll 218 and the longitudinal folding tool 220 remain stationary while the feed roll 214 and the take-up roll 224 rotate in the direction 230. In this alternate embodiment, the feed roll 214 and the take-up roll 224 rotate at the same speed and in the same direction so that the optical fiber 12 does not get twisted.

In use of the system 200, the base material and the shrinkage reduction material for the outer jacket 18 are delivered to the hopper 206 by the first and second conveyors 208, 210, respectively. The controller 228 preferably controls the proportions of the base material and the shrinkage reduction material delivered to the hopper 206. In one embodiment, the shrinkage reduction material constitutes less than 2% by weight of the total material delivered to the hopper 206. In another embodiment, the shrinkage reduction material constitutes less than about 1.4% by weight.

From the hopper 206, the material moves by gravity into the extruder 204. In the extruder 204, the material is mixed, masticated, and heated. In one embodiment, the material is heated to a temperature greater than the melting temperature of the base material, but less than the melting temperature of the shrinkage reduction material. The temperature is preferably sufficiently high to soften the shrinkage reduction material such that the shrinkage reduction material is workable and extrudable. The extruder 204 is heated by the heating system 212. The extruder 204 also functions to convey the material to the crosshead 202, and to provide pressure for forcing the material through the crosshead 202.

Figure 13:
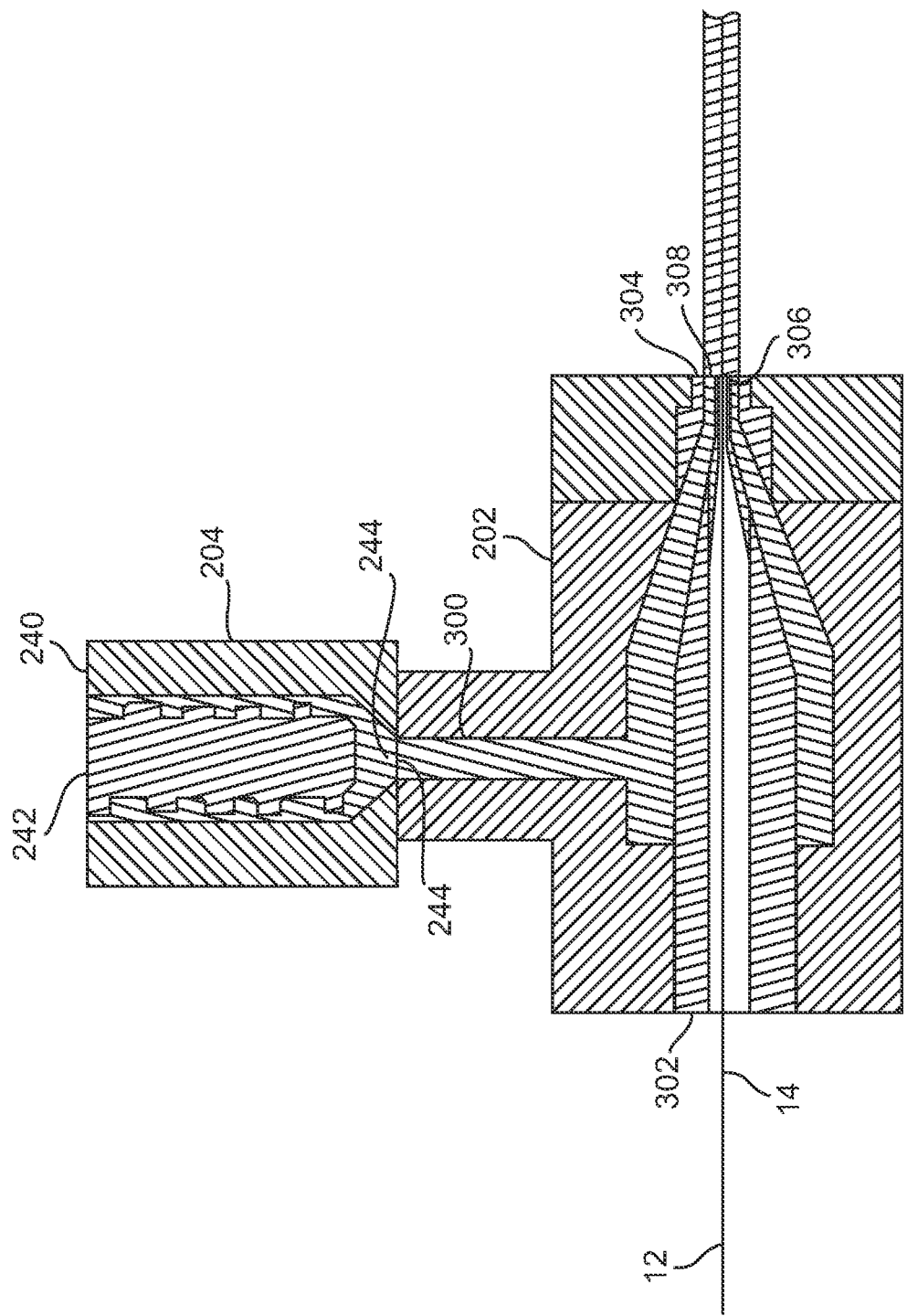
FIG. 13 is a cross-section view of a crosshead suitable for use with the system of FIG. 12.

Referring now to FIG. 13, the extruder 204 is depicted as including an extruder barrel 240 and an auger-style extruder screw 242 positioned within the extruder barrel 240. An extruder screen 244 can be provided at the exit end of the extruder 204. The extruder screen 244 prevents pieces too large for extrusion from passing from the extruder into the crosshead 202.

The crosshead 202 includes a jacket material input location 300 that receives thermoplastic material from the extruder 204. The crosshead 202 also includes a tip 302 and a die 304. The tip 302 defines an inner passageway 306 through which the optical fiber 12 and the strength layer 14 are fed. The die 304 defines an annular extrusion passage 308 that surrounds the exterior of the tip 302. The crosshead 202 defines an annular passageway for feeding the thermoplastic material to the annular extrusion passage 308. Within the crosshead 202, the flow direction of the thermoplastic material turns 90 degrees relative to the flow direction of the extruder 204 to align with the bundled fiber.

Within the crosshead 202, the material provided by the extruder 204 is preferably maintained at a temperature greater than the melt temperature of the base material of the outer jacket 18, but less than the melt temperature of the shrinkage reduction material. In one embodiment, the temperature of the thermoplastic material is high enough to thermally bond the thermoplastic material to the binder 34 of the strength layer 14 as the thermoplastic material is extruded. The extruded fiber optic cable 10 is then cooled and shape set at the water trough 222. The extrusion process can be a pressure or semi-pressure extrusion process where product leaves the crosshead 202 at the desired shape, or an annular extrusion process where the product is drawn down after extrusion. After cooling, the product is collected on the take-up roll 224.

Figure 14:
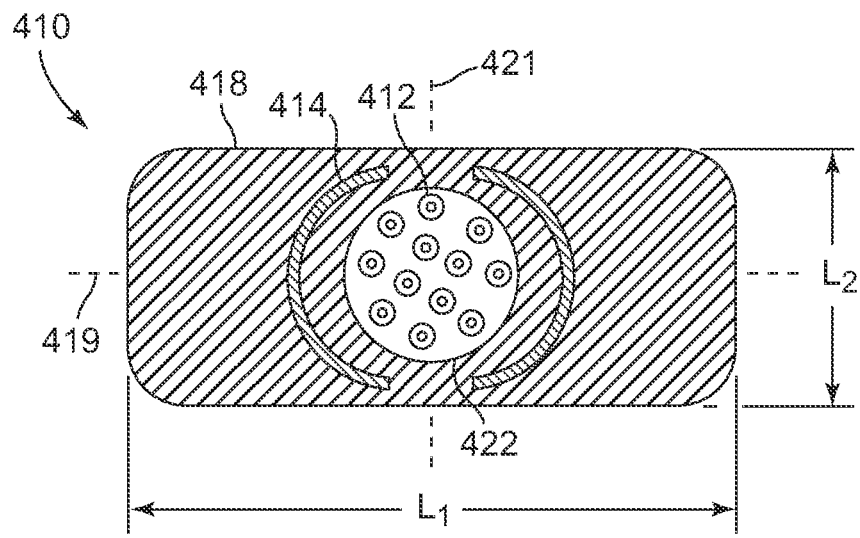
FIG. 14 is a cross-sectional view of a first example alternate embodiment of a fiber optic cable having aspects in accordance with the principles of the present disclosure.

Referring now to FIG. 14, a transverse cross-sectional view of another fiber optic cable 410 having features in accordance with the principles of the present disclosure is shown. The fiber optic cable 410 includes a plurality of optical fibers 412, a strength layer 414 positioned outside and at least partially around the optical fibers 412, and an outer jacket 418. The outer jacket 418 surrounds the optical fibers 412 and the strength layer 414 is imbedded within the outer jacket 418.

In the depicted embodiment of FIG. 14, the fiber optic cable 410 is provided with twelve of the optical fibers 412. It will be appreciated that the optical fibers 412 can have the same construction as the optical fiber 12 described with respect to the embodiment of FIG. 1. In one embodiment, the fiber optic cable 410 includes at least one optical fiber 412. In another embodiment, the fiber optic cable 410 includes 1 to 24 optical fibers 410. In another embodiment, the fiber optic cable 410 includes at least 12 optical fibers 410.

The outer jacket 418 is shown having a non-circular transverse cross-sectional shape. For example, the outer jacket 418 is shown having an outer profile that is elongated in a first direction as compared to a perpendicular second direction. For example, the outer jacket 418 is shown having a longer dimension $L_1$ along a major axis 419 as compared to a dimension $L_2$ that extends along a minor axis 421 of the outer jacket 418. As depicted in FIG. 14, the outer jacket 418 has a generally rectangular or oblong outer profile.

It will be appreciated that the outer jacket 418 can be manufactured of a variety of different polymeric materials. In one embodiment, the outer jacket 418 is made of a low density polyethylene material. In another embodiment, the outer jacket 418 is made of a medium density polyethylene material. In another embodiment, the outer jacket 418 is made of a high density polyethylene material. In one embodiment, the outer jacket 418 is made of a low density ultra-high molecular weight polyethylene material. In another embodiment, the outer jacket 418 is made of a medium density ultra-high molecular weight polyethylene material. In another embodiment, the outer jacket 418 is made of a high density ultra-high molecular weight polyethylene material. In the depicted embodiment, the outer jacket 418 defines a central channel 422 in which the optical fibers 412 are located. It will be appreciate that the optical fibers 412 can be contained within one or more buffer tubes positioned within the channel 422. For example, in one embodiment, the optical fibers 412 can be provided in one large buffer tube that lines the channel 422 of the outer jacket 418. In other embodiments, the optical fibers 412 can be positioned directly within the channel 422 without any intermediate tubes or layers positioned between the optical fibers 412 and the material of the outer jacket 418 that defines the channel 422. In such embodiment, the outer jacket 418 itself functions as a buffer tube.

To prevent water from migrating along the channel 422, structures can be provided within the channel 422 for absorbing water or otherwise blocking water flow along the length of the channel 422. For example, water blocking gel can be provided within the channel 422. In other embodiments, water-swellable fibers, tape or thread can be provided within the channel 422.

Referring still to FIG. 14, the strength layer 414 is shown including two flat and flexible sheets or films that are embedded or otherwise position within the outer jacket 418. The flat and flexible sheets or films can have the same construction as the strength layer 14 described with respect to FIGS. 3-5. For example, each of the flexible sheets or films can include a matrix material in which a plurality of reinforcing fibers are embedded or otherwise integrated. The sheets or films are shown positioned on opposite sides of the minor axis 421 of the outer jacket 418. The flexible sheets or films are also shown on opposite sides of the channel 422 and are shown having a curvature that generally matches the curvature of the outer channel. It will be appreciated that the sheets or films provide axial reinforcement to the outer jacket 418.

Figure 15:
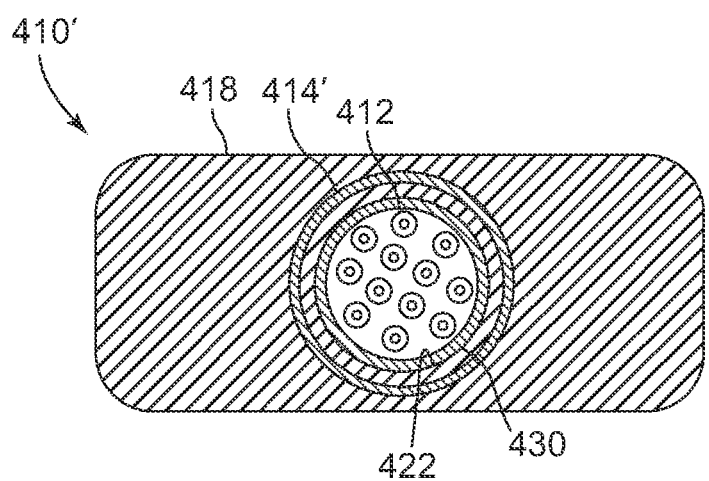
FIG. 15 is a cross-sectional view of a second example alternate embodiment of a fiber optic cable having aspects in accordance with the principles of the present disclosure.

FIG. 15 shows a second alternative fiber optic cable 410' having the same general design as the fiber optic cable 410. The second alternative fiber optic cable 410' has a modified strength layer 414' having a single sheet or film that fully circumferentially surrounds the channel 422 of the outer jacket 418. Additionally, the channel 422 of the outer jacket 418 is shown lined with a buffer tube 430.

It will be appreciated that the cables of FIGS. 14 and 15 can be used as drop cables in a fiber optic network. For example, the fiber optic cables 410, 410' can be used as drop cables in fiber optic networks such as the networks disclosed in U.S. Provisional Patent Application Ser. No. 61/098,494, which is entitled "Methods and Systems for Distributing Fiber Optic Telecommunications Services to a Local Area," filed on Sep. 19, 2008 and hereby incorporated by reference in its entirety.

Figure 16:
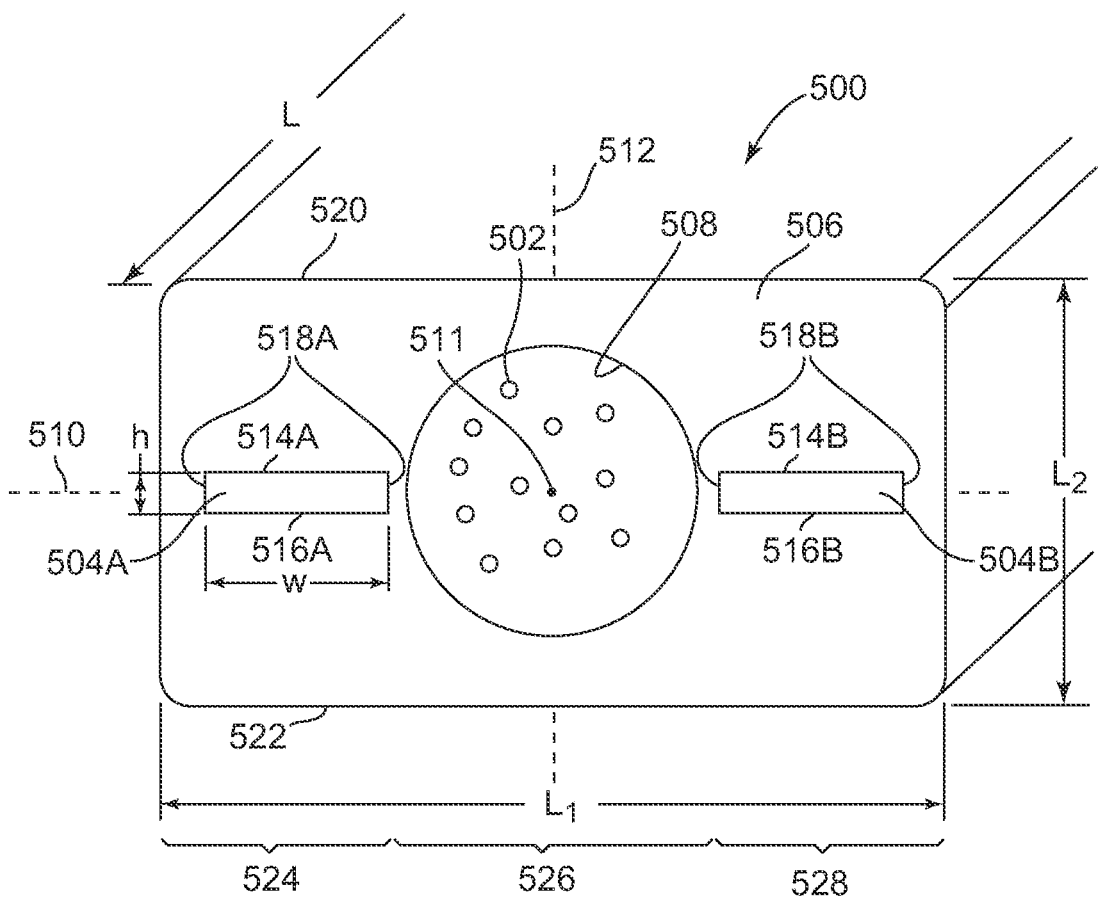
FIG. 16 is a cross-sectional view of a third example alternate embodiment of a fiber optic cable having aspects in accordance with the principles of the present disclosure.

FIG. 16 is a cross-sectional view of a third example alternate embodiment of a fiber optic cable 500 from an axial perspective. As illustrated in the example of FIG. 16, fiber optic cable 500 includes a plurality of optical fibers 502, a first strength layer 504A, a second strength layer 504B, and an outer jacket 506. This disclosure refers to the strength layer 504A and the strength layer 504B collectively as strength layers 504. The outer jacket 506 defines a channel 508 within which the optical fibers 502 are disposed. The strength layer 504A and the strength layer 504B are embedded within the outer jacket 506. In one example, the strength layers 504 are coated with ethylene acetate to bond the strength layers 504 to the outer jacket 506. Each of strength layers 504 can have the same construction as the strength layer 14 described above.

In the example embodiment depicted in FIG. 16, the fiber optic cable 500 is provided with twelve of the optical fibers 502. It will be appreciated that the optical fibers 502 can have the same construction as the optical fiber 12 described with respect to the example of FIG. 1. Furthermore, it will be appreciated that in other examples, the fiber optic cable 500 may include more than twelve optical fibers or fewer than twelve optical fibers. For example, in one embodiment, the fiber optic cable 500 may include twenty four optical fibers 502.

Figure 16A:
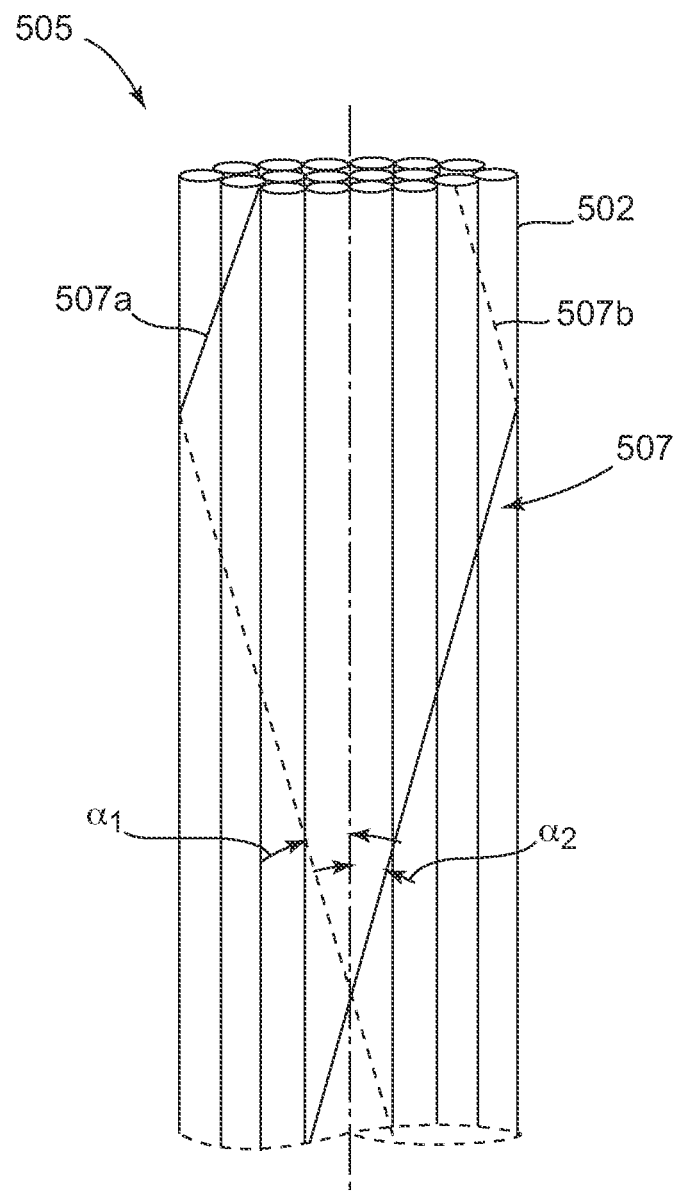
FIG. 16A is a schematic view of a fiber bundle suitable for use with the fiber optic cable of FIG. 16.

Referring now to FIG. 16A, a fiber bundle 505 is shown. The fiber bundle 505 includes a plurality of optical fibers 502. The plurality of optical fibers 502 is held together by a plurality of strength members 507. In the depicted embodiment of FIG. 16A, only two strength members 507 are shown for ease of illustration purposes only.

The strength members 507 are disposed in two sets about the optical fibers 502. In the subject embodiment, the strength members 507 include a first set of strength members 507a and a second set of strength members 507b. The second set of strength members 507b is disposed over the first set of strength members 507a such that the first and second sets of strength members 507a, 507b are unbraided or nonwoven.

In the subject embodiment, the first and second sets of strength members 507a, 507b are contra-helically served. For example, in the depicted embodiment of FIG. 16A, the first set of strength members 507a is disposed about the optical fibers 502 in a generally right-handed helical configuration while the second set of strength members 507b is disposed over the first set of strength members 507a in a generally left-handed helical configuration. The first and second sets of strength members 507a, 507b are disposed at angles $\alpha_1$, $\alpha_2$ from a longitudinal line 509. In one embodiment, the angles $\alpha_1$, $\alpha_2$ are equal but opposite. In another embodiment, the angles $\alpha_1$, $\alpha_2$ are in the range of about 0.1 degrees to about 20 degrees. In another embodiment, the angles $\alpha_1$, $\alpha_2$ are in the range of about 5 degrees to about 20 degrees. In another embodiment, the angles $\alpha_1$, $\alpha_2$ are in the range of about 0.1 degrees to about 15 degrees. In another embodiment, the angles $\alpha_1$, $\alpha_2$ are in a range of about 1 degree to about 15 degrees. In another embodiment, the angles $\alpha_1$, $\alpha_2$ are in the range of about 5 degrees to about 15 degrees. In another embodiment, the angles $\alpha_1$, $\alpha_2$ are in a range of about 0.1 degrees to about 5 degrees. In another embodiment, the angles $\alpha_1$, $\alpha_2$ are in a range of about 0.1 degrees to about 1 degree.

In the subject embodiment, each of the strength members 507 has a lay length in a range of about 3 inches to about 18 inches. The lay length is the axial distance in which each of the strength members 507 wraps 360° around the plurality of optical fibers 502.

In one embodiment, the strength members 507 are strands of aramid yarn. In another embodiment, the strength members 507 are water swellable yarns. In one embodiment, there are one to ten strength members 507 in the first set of strength members 507a and one to ten strength members 507 in the second set of strength members 507b. In another embodiment, there are one to eight strength members 507 in the first set of strength members 507a and one to eight strength members 507 in the second set of strength members 507b. In another embodiment, there are four strength members 507 in the first set of strength members 507a and four strength members 507 in the second set of strength members 507b.

Referring again to FIG. 16, the fiber optic cable 500 has a non-circular transverse cross-sectional shape. In the example of FIG. 16, the outer jacket 506 has a longer dimension $L_1$ along a major axis 510 of the outer jacket 506 as compared to a dimension $L_2$ that extends along a minor axis 512 of the outer jacket 506. As depicted in FIG. 16, the outer jacket 506 has a generally rectangular or oblong outer profile. The major axis 510 and the minor axis 512 intersect perpendicularly at a lengthwise axis 511 of the fiber optic cable 500.

As viewed in the example of FIG. 16, the width of outer jacket 506 may be divided lengthwise into three portions: a first portion 524 to the left of the left side of the channel 508, a second portion 526 between the left side of the channel 508 and a right side of the channel 508, and a third portion 528 to the right of the right side of the channel 508. The first portion 524 and the third portion 528 are solid throughout. Consequently, the first portion 524 and the third portion 528 of the outer jacket 506 prevent the outer jacket 506 from compressing inward onto the channel 508 when a clamp or other structure is used to retain the fiber optic cable 500. Because the outer jacket 506 does not compress inward onto the channel 508, the optical fibers 502 are not crushed when the clamp is used to retain the fiber optic cable 500.

The strength layers 504 have height (h), width (w), and length dimensions. The length dimensions of the strength layers 504 are aligned along a lengthwise axis 511 of the fiber optic cable 500. A top surface 514A of the strength layer 504A and a bottom surface 16A of the strength layer 504A are aligned parallel to the major axis 510. Side surfaces 518A of the strength layer 504A are aligned parallel to the minor axis 512. The top surface 514A and the bottom surface 516A are wider along the major axis 510 than the height of the side surfaces 518A along the minor axis 512. Similarly, a top surface 514B of the strength layer 504B and a bottom surface 516B of the strength layer 504B are aligned parallel to the major axis 510. Side surfaces 518B of the strength layer 504B are aligned parallel to the minor axis 512. The top surface 514B and the bottom surface 516B are wider along the major axis 510 than the height of the side surfaces 518B along the minor axis 512.

The strength layers 504 are aligned along the major axis 510 such that the major axis 510 bisects the heights h of the strength layers 504. The major axis 510 is generally parallel to the widths w of the strength layers 504. As used in this disclosure, "generally parallel" means parallel or almost parallel. The strength layers 504 can include a plurality of strength members held together in a flat configuration by a binder. For example, the strength layers 504 can have the same construction as the strength layer 14 previously discussed herein.

The top surface 514A of the strength layer 504A is a consistent distance from a top surface 520 of the outer jacket 506 and the bottom surface 516A is a consistent distance from a bottom surface 522 of the outer jacket 506. Similarly, the top surface 514B of the strength layer 504B is a consistent distance from the top surface 520 of the outer jacket 506 and the bottom surface 516B is a consistent distance from the bottom surface 522 of the outer jacket 506. Because of this alignment of the strength layers 504 within the outer jacket 506, it may be possible to spool the fiber optic cable 500 in a relatively tight diameter.

Figure 17:
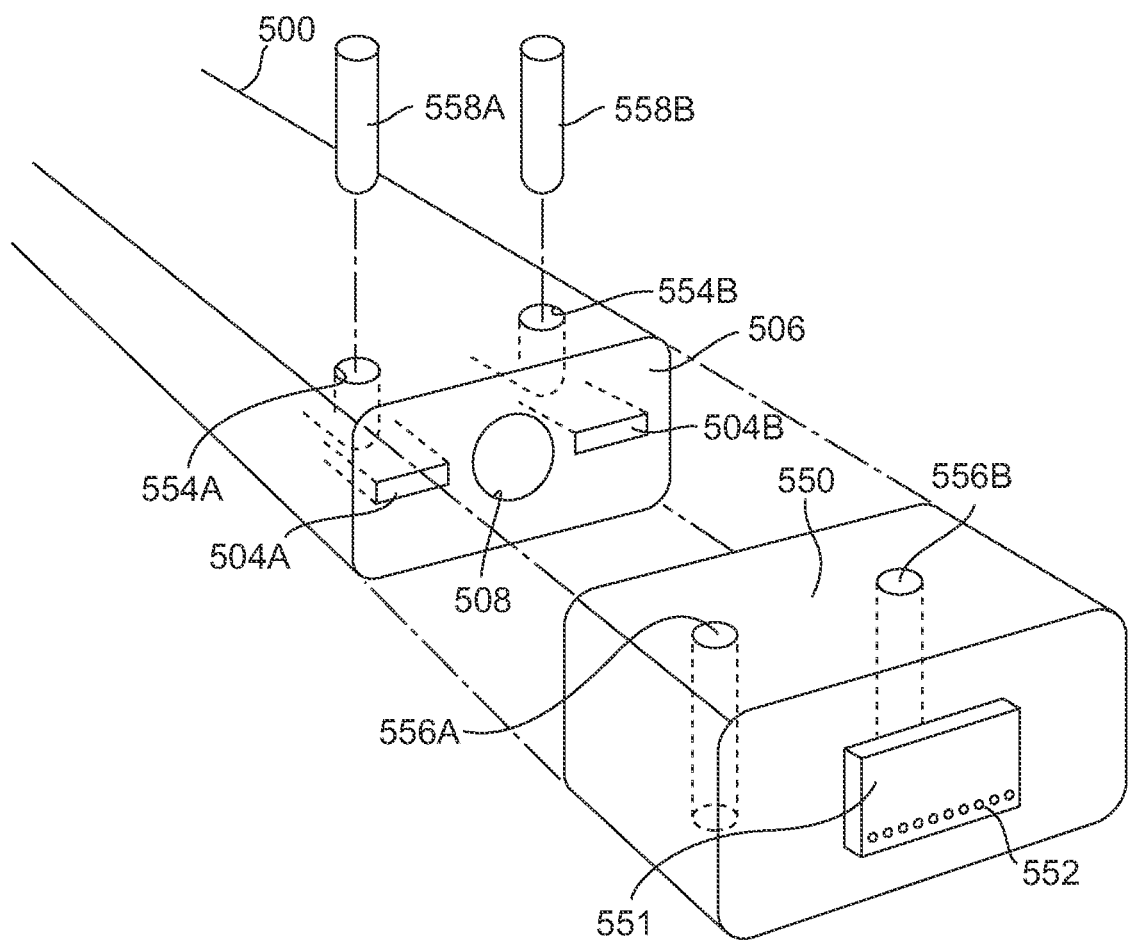
FIG. 17 is a schematic view of the third example alternate embodiment of the fiber optic cable with a connector belonging to a first example connector type.

FIG. 17 is a schematic view that illustrates an example technology to attach the fiber optic cable 500 with a connector 550 belonging to a first example connector type. In the example of FIG. 17, the strength layers 504 of the fiber optic cable 500 and the channel 508 of the fiber optic cable 500 are shown. Other details of the fiber optic cable 500 are omitted for clarity.

Although not visible in the example of FIG. 17 due to perspective, the connector 550 is shaped to define a recess into which an end of the fiber optic cable 500 can be inserted. Furthermore, the connector 550 includes a ferrule 551 that serves to align the optical fibers 502 with corresponding optical fibers in a separate connector. In the example of FIG. 17, ends 552 of the optical fibers 502 are shown.

In preparation to attach connector 550 to the fiber optic cable 500, holes 554A and 554B are formed in the fiber optic cable 500. In the current disclosure, the hole 554A and the hole 554B are collectively referred to as "holes 554." The holes 554 may be formed in a variety of ways. For example, the holes 554 may be formed by drilling, melting, puncturing, punching, or some other process. The hole 554A extends transversely through the outer jacket 506 of the fiber optic cable 500 and through the strength layer 504A of the fiber optic cable 500. The hole 554B extends transversely through the outer jacket 506 and the strength layer 504B.

A hole 556A and a hole 556B are defined in the connector 550. In the current disclosure, the hole 556A and the hole 556B are collectively referred to as "holes 556." Holes 556 extend transversely through the connector 550. Holes 556 may have approximately the same diameter as holes 554 and are defined in the connector 550 such that, when the fiber optic cable 500 is inserted into the connector 550, the holes 556 are aligned with the holes 554 in the fiber optic cable 500.

When the fiber optic cable 500 is inserted into the connector 550, a retention member 558A can be inserted through the hole 556A in the connector 550 and the hole 554A in the fiber optic cable 500. Likewise, a retention member 558B can be inserted through the hole 556B in the connector 550 and the hole 554B in the fiber optic cable 500. In the current disclosure, the retention member 558A and the retention member 558B are collectively referred to as "retention members 558." The retention members 558 may have diameters that are approximately the same diameter as the diameters of the holes 554 and the holes 556. Retention members 558 may be a variety of different types of retention members including pins, holders, retainers, clips, screws, rivets, bolts, latches, clasps, hooks, pegs, and other types of retention members.

When the retention members 558 are inserted through the holes 554 and the holes 556, the retention members 558 pass through the strength layers 504. Furthermore, after the retention members 558 are inserted through the holes 554 and the holes 556, the retention members 558 can be secured in position using a variety of techniques including taping, gluing, bonding, friction fit, melting, or another technique. In this way, the retention members 558 secure the connector 550 to the fiber optic cable 500.

It will be appreciated that FIG. 17 is merely an example. Other technologies for connecting the fiber optic cable 500 to the connector 550 may have many different variations. For instance, retention members 558, holes 554, and holes 556 may be square, round, or other shapes.

Figure 18:
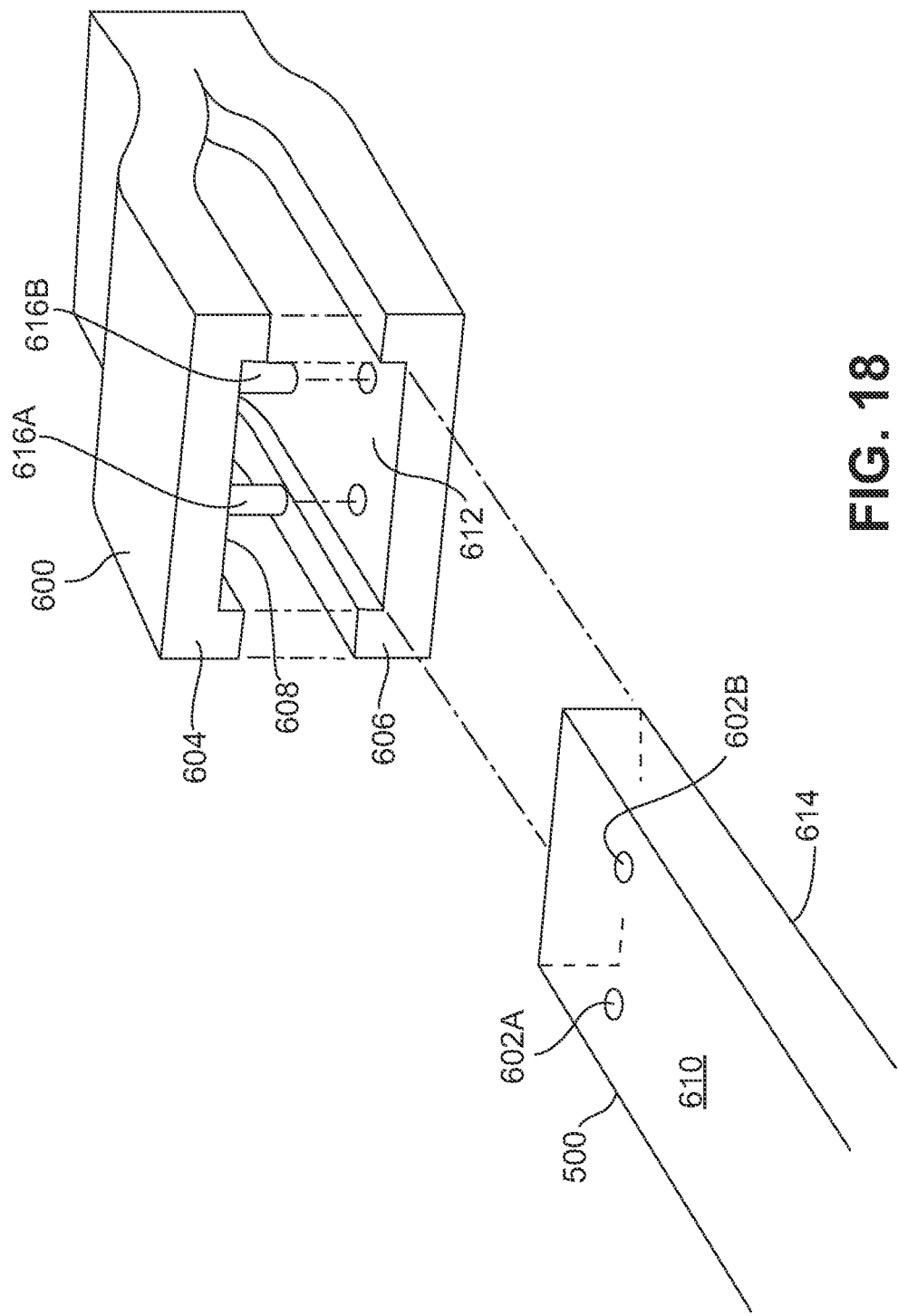
FIG. 18 is a schematic view of the third example alternate embodiment of the fiber optic cable with a connector belonging to a second example connector type.

FIG. 18 is a schematic view of the third example alternate embodiment of the fiber optic cable 500 with a connector 600 belonging to a second connector type. The fiber optic cable 500 has the same construction as the fiber optic cable 500 illustrated in the example of FIG. 16 and FIG. 17.

In the example of FIG. 18, the fiber optic cable 500 has a hole 602A and a hole 602B (collectively, "holes 602"). The holes 602 in the fiber optic cable 500 may be formed in a variety of ways. For example, the holes 602 may be formed by drilling, melting, punching, puncturing, or some other process. The hole 602A extends transversely through the outer jacket 506 of the fiber optic cable 500 and through the strength layer 504A of the fiber optic cable 500. The hole 602A extends transversely through the outer jacket 506 and the strength layer 504B.

The connector 600 is split into a first piece 604 and a second piece 606. Retaining members 616A and 616B (collectively, "retaining members 616") are integrated into the first piece 604 such that the retaining members 616 extend into a recess defined by the first piece 604 and the second piece 606. The retaining members 616 may be a variety of different types of retaining members including pegs, pins, screws, clips, rivets, and other types of retaining members.

The first piece 604 and the second piece 606 may be constructed such that the first piece 604 and the second piece 606 may be separated such that the fiber optic cable 500 may be inserted into the recess defined by the first piece 604 and the second piece 606. After the fiber optic cable 500 is inserted into the recess defined by the first piece 604 and the second piece 606, the first piece 604 and the second piece 606 may be repositioned such that an inner surface 608 of the first piece 604 is in contact with a top surface 610 of the fiber optic cable 500 and an inner surface 612 of the second piece 606 is in contact with a bottom surface 614 of the fiber optic cable 500.

When the first piece 604 and the second piece 606 are repositioned in this way, the retaining members 616 are disposed within corresponding holes 602 in the fiber optic cable 500. In other words, the retaining members 616 extend through the outer jacket 506 and the strength layers 504 of the fiber optic cable 500. In this way, the retaining members 616 act to retain the fiber optic cable 500 within the connector 600.

Although not visible in the example of FIG. 18 due to perspective, the connector 600 includes a ferrule. When the fiber optic cable 500 is inserted into the recess defined by the first piece 604 and the second piece 606, the ferrule serves to align the optical fibers of the fiber optic cable 500 with corresponding optical fibers in a separate connector.

Figure 19:
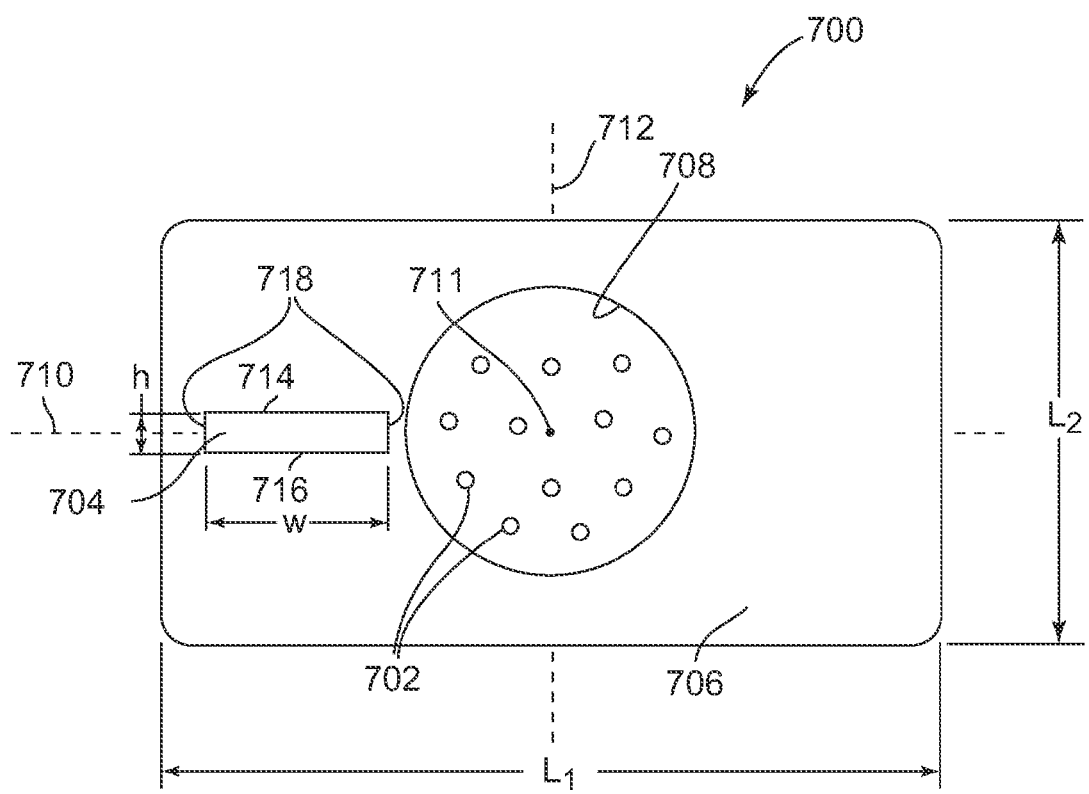
FIG. 19 is a cross-sectional view of a fourth example alternate embodiment of a fiber optic cable having aspects in accordance with the principles of the present disclosure.

FIG. 19 is a cross-sectional view of a fourth example alternate embodiment of a fiber optic cable 700. The fiber optic cable 700 includes a plurality of optical fibers 702, a strength layer 704, and an outer jacket 706. The outer jacket 706 defines a channel 708 within which the optical fibers 502 are disposed. The strength layer 704 is embedded within the outer jacket 706. In one example, the strength layer 704 is coated with ethylene acetate to bond the strength layer 704 to the outer jacket 706. In one example, the strength layer 704 has the same construction as the strength layer 14 previously discussed herein.

It should be noted that the fiber optic cable 700 includes one strength layer, as opposed to the two strength layers in the fiber optic cable 500 illustrated in the example of FIG. 16. Fiber optic cables that include a single strength layer, as opposed to two or more strength layers, may be less expensive to manufacture.

In the example embodiment depicted in FIG. 19, the fiber optic cable 700 is provided with twelve of the optical fibers 702. It will be appreciated that the optical fibers 702 can have the same construction as the optical fiber 12 described with respect to the example of FIG. 2. Furthermore, it will be appreciated that in other examples, the fiber optic cable 700 may include more than twelve optical fibers or fewer than twelve optical fibers.

The fiber optic cable 700 has a non-circular transverse cross-sectional shape. In the example of FIG. 19, the outer jacket 706 has a longer dimension $L_1$ along a major axis 710 of the outer jacket 706 as compared to a dimension $L_2$ that extends along a minor axis 712 of the outer jacket 706. The major axis 710 and the minor axis 712 intersect perpendicularly at a lengthwise axis 711 of the fiber optic cable 700. As depicted in FIG. 19, the outer jacket 706 has a generally rectangular or oblong outer profile.

The strength layer 704 has a height (h), a width (w), and a length dimension. The length dimension of the strength layer 704 is aligned along the lengthwise axis 711 of the fiber optic cable 700. A top surface 714 of the strength layer 704 and a bottom surface 716 of the strength layer 704 are aligned parallel to the major axis 710. Side surfaces 718 of the strength layer 704 are aligned parallel to the minor axis 712. The top surface 714 and the bottom surface 716 are wider along the major axis 710 than the height of the side surfaces 718 along the minor axis 712. The strength layer 704 is aligned along the major axis 710 such that the major axis 710 bisects the height h of the strength layer 704 and is generally parallel to the width w of the strength layer 704.

Various modifications and alterations of this disclosure will become apparent to those skilled in the art without departing from the scope and spirit of this disclosure, and it should be understood that the scope of this disclosure is not to be unduly limited to the illustrative embodiments set forth herein.

What is claimed is:

1. A fiber optic cable comprising:
   a single bend-insensitive optical fiber that extends along a length of the fiber optic cable, the optical fiber including a first cladding layer surrounding a core, a trench layer surrounding the first cladding layer, a second cladding layer surrounding the trench layer, and a coating layer surrounding the second cladding layer, the coating layer having an outer diameter less than 500 μm;

a strength layer including a sheet-like reinforcing structure, the sheet-like reinforcing structure surrounding-the single bend-insensitive optical fiber to form a cylindrical reinforcing tube, the sheet-like reinforcing structure having longitudinal edges that overlap each other along a longitudinal seam, the reinforcing tube extending along the length of the fiber optic cable; and an outer jacket surrounding the sheet-like reinforcing structure, the outer jacket having an outer diameter less than 1.6 mm, and the outer jacket extending along the length of the fiber optic cable; and the fiber optic cable having a construction with no buffer layer positioned between the coating layer of the single bend-insensitive optical fiber and the sheet-like reinforcing structure, wherein the reinforcing tube formed by the sheet-like reinforcing structure defines a longitudinal bore for receiving the single bend-insensitive optical fiber, and wherein the reinforcing tube defined by the sheet-like reinforcing structure contacts the coating layer of the single bend-insensitive optical fiber and is configured to separate the single bend-insensitive optical fiber from the outer jacket;

wherein the sheet-like reinforcing structure includes aramid yarns held together by a matrix material that maintains a distribution of the aramid yards around the single bend-insensitive optical fiber, and wherein the matrix material of the sheet-like reinforcing structure is bonded to an inner diameter of the outer jacket.

2. A fiber optic cable as claimed in claim 1, wherein the outer jacket includes a base material and a shrinkage reduction material.

3. A fiber optic cable as claimed in claim 2, wherein the shrinkage reduction material is liquid crystal polymer.

4. A fiber optic cable as claimed in claim 1, wherein the plurality of aramid yarns extends a length of the strength layer.

5. A fiber optic cable as claimed in claim 1, wherein first and second axial ends of the strength layer are not rotationally offset from each other.

6. A fiber optic cable as claimed in claim 1, wherein the outer jacket is wider along a major axis of the outer jacket than along a minor axis of the outer jacket, the outer jacket surrounding the strength layer and defining a channel disposed at a lengthwise axis of the outer jacket through which the single bend-insensitive optical fiber passes, the outer jacket comprising a first portion disposed on a first side of the channel and a second portion disposed on an opposite side of the channel, wherein the major axis and the minor axis intersect perpendicularly at the lengthwise axis of the outer jacket.

7. A fiber optic cable as claimed in claim 6, wherein the strength layer has a width and a height and the strength layer is disposed within the first portion of the outer jacket such that the major axis bisects the height of the strength layer and is generally parallel to the width of the strength layer.

8. A fiber optic cable as claimed in claim 7, wherein the width of the strength layer is greater than the height of the strength layer.

9. A method for manufacturing a fiber optic cable including a bend insensitive optical fiber including a first cladding layer surrounding a core, a trench layer surrounding the first cladding layer, a second cladding layer surrounding the trench layer, and a coating layer surrounding the second cladding layer, the coating layer having an outer diameter less than 500 μm, a strength layer formed by a reinforcing sheet including a plurality of tensile reinforcing fibers held together by a matrix material, and an outer jacket, the method comprising:

shaping the reinforcing sheet around the bend insensitive optical fiber from a flat configuration into a cylindrical reinforcing tube having an outer diameter less than 1.2 mm by passing the bend insensitive optical fiber and the reinforcing sheet through a longitudinal folding tool where the reinforcing sheet is shaped about the bend insensitive fiber such that no buffer layer is positioned between the bend insensitive optical fiber and the cylindrical reinforcing tube;

forming the outer jacket about the cylindrical reinforcing tube by extruding a thermoplastic material about the cylindrical reinforcing tube such that the outer jacket has an outer diameter less than 1.6 mm; and thermally bonding the thermoplastic material to the matrix material during extrusion of the outer jacket about the cylindrical reinforcing tube.

10. A method for manufacturing a fiber optic cable as claimed in claim 9, further comprising shaping the reinforcing sheet around the bend insensitive optical fiber so that first and second longitudinal edges of the reinforcing sheet are helically disposed along a length of the reinforcing sheet.

11. A method for manufacturing a fiber optic cable as claimed in claim 9, wherein extruding the thermoplastic material comprises extruding the thermoplastic material such that the outer jacket is wider along a major axis of the outer jacket than along a minor axis of the outer jacket, wherein the major axis and the minor axis intersect perpendicularly at a lengthwise axis of the outer jacket.

12. A fiber optic cable as claimed in claim 1, wherein the outer diameter of the outer jacket is less than or equal to about 1.2 millimeters.

13. A fiber optic cable as claimed in claim 1, wherein the outer jacket has a non-circular transverse cross-sectional shape.

14. A fiber optic cable as claimed in claim 1, wherein the outer jacket has a circular transverse cross-sectional shape.

15. A fiber optic cable as claimed in claim 1, wherein the aramid yarns are embedded in the matrix material.

16. A method for manufacturing a fiber optic cable as claimed in claim 9, further comprising forming the reinforcing sheet from a matrix material and aramid yarns.

17. A method for manufacturing a fiber optic cable as claimed in claim 16, wherein the aramid yarns are embedded in the matrix material.

18. The fiber optic cable of claim 1, wherein the jacket includes polyvinyl chloride and wherein the outer diameter of the outer jacket is less than or equal to about 1.2 mm.

19. The fiber optic cable of claim 1, wherein the longitudinal seam does not helically rotate as the longitudinal seam extends along the length of the fiber optic cable.

20. The fiber optic cable of claim 1, wherein the outer diameter of the coating layer is less than or equal to 250 microns.

21. The fiber optic cable of claim 20, wherein the outer diameter of the outer jacket is less than or equal to about 1.2 mm.

* * * * *